(12) United States Patent
Greenwald et al.

(10) Patent No.: US 6,777,387 B2
(45) Date of Patent: Aug. 17, 2004

(54) TERMINALLY-BRANCHED POLYMERIC LINKERS CONTAINING EXTENSION MOIETIES AND POLYMERIC CONJUGATES CONTAINING THE SAME

(75) Inventors: Richard B. Greenwald, Somerset, NJ (US); Yun H. Choe, Green Brook, NJ (US)

(73) Assignee: Enzon Pharmaceuticals, Inc., Bridgewater, NJ (US)

( * ) Notice: Subject to any disclaimer, the term of this patent is extended or adjusted under 35 U.S.C. 154(b) by 429 days.

(21) Appl. No.: 09/823,296

(22) Filed: Mar. 29, 2001

(65) Prior Publication Data

US 2002/0015691 A1 Feb. 7, 2002

Related U.S. Application Data

(60) Provisional application No. 60/193,931, filed on Mar. 31, 2000.

(51) Int. Cl.[7] ................ A61K 38/16; A61K 31/785
(52) U.S. Cl. .................. 514/8; 514/49; 514/616; 536/28.5; 424/9.4; 424/78.17; 564/152; 564/153; 564/159
(58) Field of Search ............... 514/8, 49, 616, 514/43; 536/28.5; 424/9.4, 78.17; 564/152, 153, 159

(56) References Cited

U.S. PATENT DOCUMENTS

| | | | |
|---|---|---|---|
| 5,283,339 A | 2/1994 | Arnold et al. | |
| 5,382,657 A | 1/1995 | Karasiewicz et al. | |
| 5,433,886 A | 7/1995 | Sherbondy et al. | |
| 5,454,954 A | 10/1995 | Alfano et al. | |
| 5,583,206 A | 12/1996 | Snow et al. | |
| 5,643,575 A | 7/1997 | Martinez et al. | |
| 5,646,159 A | 7/1997 | Wall et al. | |
| 5,679,852 A | 10/1997 | Platzek et al. | |
| 5,693,310 A | 12/1997 | Gries et al. | |
| 5,693,626 A | 12/1997 | Saksena et al. | |
| 5,756,825 A | 5/1998 | Safavy et al. | |
| 5,919,455 A | 7/1999 | Greenwald et al. | |
| 5,932,462 A | 8/1999 | Harris et al. | |
| 5,968,943 A | 10/1999 | Cao et al. | |
| 5,994,517 A | 11/1999 | Ts'o et al. | |
| 6,020,373 A | 2/2000 | Schellenberg et al. | |
| 6,039,931 A | 3/2000 | Schmitt-Willich et al. | |
| 6,113,906 A | 9/2000 | Greenwald et al. | |
| 6,395,266 B1 * | 5/2002 | Martinez et al. ........... 424/78.3 |

FOREIGN PATENT DOCUMENTS

| | | |
|---|---|---|
| EP | 0 809 996 A2 | 3/1997 |
| WO | WO 95/09883 | 4/1995 |

OTHER PUBLICATIONS

Benaglia, M., et al., Synthesis of New Poly(ethyleneglycol)s with a High Loading Capacity, J. Org. Chem., 1998, pp. 8628–8629.

Chen, J., et al., Thiol–Reactive Luminescent Chelates of Terbium and Europium, Bioconjugate Chem., 1999, pp. 311–315.

Hines, J.V., et al., Paramagnetic Oligonucleotides: Contrast Agents for Magnetic Resonance Imaging with Proton Relaxation Enhancement Effects, Bioconjugate Chem., Mar./Apr. 1999, vol. 10, No. 2, pp. 155–158.

Yamasaki, N., et al., Some Properties of Ricin D Modified with a Methoxypolyethylene Glycol Derivative, Agric. Biol. Chem., 1990, vol. 54, No. 10, pp. 2635–2640.

Greenwald, R.B., et al., Drug Delivery Systems Employing 1,4–or 1,6–Elimination: Poly (ethyleneglycol) Prodrugs of Amine–Containing Compounds, Journal of Medicinal Chemistry, 1999, vol. 42, No. 18, pp. 3657–3667.

Shearwater Polymers Catalog, Inc, Group Three A—Active Esters, p. 13, 2000.

Greenwald, R.B. et al. ,Poly(ethylene glycol) Conjugated Drugs and Prodrugs: A Comprehensive Review, Critical Reviews in Therapeutic Drug Carrier Systems, 2000, vol. 17, No. 2, pp. 101–161.

Williams, M.A., et al., Synthesis of Enantiomerically Pure Diethylenetriaminepentaacetic Acid Analogues. L–Phenylalanine as the Educt for Sunstituion at the Central Acctic Acid, J. Org. Chem., 1993, vol. 58, pp. 1151–1158.

Shearwater Polymers, Inc. Catalog, Polyethylene Glycol Derivatives, Star Pegs and Branched Pegs, 1997–1998.

Shearwater Polymers, Inc. Quarterly Newsletter, Mar. 1998, No. 1.

Saksena, Anil K, et al., Concise Asymmetric Routes to 2,2,4–Trisubstituted Tetrahydrofurans Via Chiral Titanium Imide Enolates: Key Intermediates Towards Synthesis of Highly Active Azole Antifungals SCH 51048 and SCH 56595, Tetrahedron Letters, vol. 37, No. 32, pp. 5657–5660, 1996.

Twyman, L.J. et al., The Synthesis of Water Soluble Dendrimers, and their Application as Possible Drug Delivery Systems, Tetrahedron Letters, vol. 40, 1999, pp. 1743–1746.

Cerny, L.C., et al., A Potential Blood Substitute From A Tetronic Polyol And A Modified Hemoglobin, Biomat., Art. Cells & Immob. Biotech., vol. 20, No. 1, pp. 71–93, 1992.

Greenwald, R.B., Oncologic, Endocrine & Metabolic: Drug Delivery Systems: Anticancer Prodrugs and their Polymeric Conjugates, Exp. Opin. Ther. Patents, vol. 7, No. 6, pp. 601–609, 1997.

Monfardini, C., et al., A Branched Monomethoxpoly(ethylene glycol) for Protein Modification, Bioconjugate Chem 1995, vol. 6, pp. 62–69.

Ranganathan, D., et al., Synthesis of Totally Chiral, Multiple Armed, Poly Glu and Poly Asp Scaffoldings on Bifunctional Adamantane Core, Tetrahedron Letters, vol. 38, No. 7, pp. 1265–1268, 1997.

\* cited by examiner

*Primary Examiner*—Karen Cochrane Carlson
*Assistant Examiner*—Anand U Desai
(74) *Attorney, Agent, or Firm*—Muserlian, Lucas & Mercanti, LLP

(57) ABSTRACT

The present invention is directed to polymeric prodrug transport forms and methods of making and using the same. In one preferred aspect, the prodrugs are of the formula:

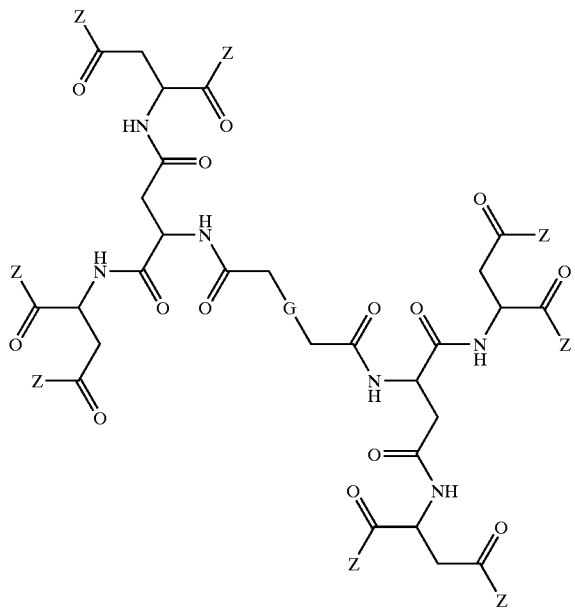

wherein
G is a polymeric residue;
Z is one of:

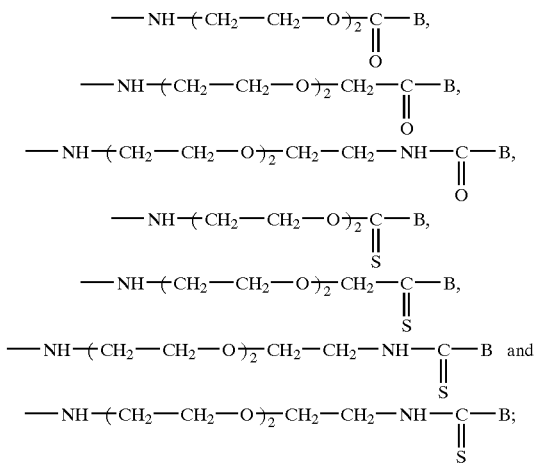

and B is a residue of a biologically active amine-containing moiety or a hydroxyl-containing moiety.

18 Claims, 11 Drawing Sheets

A: R = -NH-carbamate(spacer)-AraC
B: R = -NH-amide(spacer)-AraC
C: R = -NH-urea(spacer)-AraC
D: R = -NH-thiocarbamate(spacer)-AraC
E: R = -NH-thioamide(spacer)-AraC
F: R = -NH-thiourea(spacer)-AraC
G: R = -NH-carbonate(spacer)-Camptothecin A: R = -NH-carbamate(spacer)-AraC
B: R = -NH-amide(spacer)-AraC
C: R = -NH-urea(spacer)-AraC
D: R = -NH-thiocarbamate(spacer)-AraC
E: R = -NH-thioamide(spacer)-AraC
F: R = -NH-thiourea(spacer)-AraC
G: R = -NH-carbonate(spacer)-Camptothecin A: R = -NH-carbamate(spacer)-AraC
B: R = -NH-amide(spacer)-AraC
C: R = -NH-urea(spacer)-AraC
D: R = -NH-thiocarbamate(spacer)-AraC
E: R = -NH-thioamide(spacer)-AraC
F: R = -NH-thiourea(spacer)-AraC
G: R = -NH-carbonate(spacer)-Camptothecin

[ R = NH-carbonate (spacer)-Camptothecin ]

[ R = HN-carbonate(spacer)-Camptothecin ]

50

16mer diagram

TERMINALLY-BRANCHED POLYMERIC LINKERS CONTAINING EXTENSION MOIETIES AND POLYMERIC CONJUGATES CONTAINING THE SAME

CROSS-REFERENCE TO RELATED APPLICATION

This application claims the benefit of priority from U.S. Patent Provisional Application Serial No. 60/193,931 filed Mar. 31, 2000, the contents of which are incorporated herein by reference.

TECHNICAL FIELD

The present invention relates to polymeric-based conjugates having increased therapeutic payloads. In particular, the invention relates to the use of extension moieties which increase the efficiency of the loading of active ingredients onto the polymeric carriers.

BACKGROUND OF THE INVENTION

Over the years, several methods of administering biologically-effective materials to mammals have been proposed. Many medicinal agents are available as water-soluble salts and can be included in pharmaceutical formulations relatively easily. Problems arise when the desired medicinal agent is either insoluble in aqueous fluids or is rapidly degraded in vivo. Alkaloids are often especially difficult to solubilize.

One way to solubilize medicinal agents is to include them as part of a soluble prodrug. Prodrugs include chemical derivatives of a biologically-active parent compound which, upon administration, eventually liberate the parent compound in vivo. Prodrugs allow the artisan to modify the onset and/or duration of action of an agent in vivo and can modify the transportation, distribution or solubility of a drug in the body. Furthermore, prodrug formulations often reduce the toxicity and/or otherwise overcome difficulties encountered when administering pharmaceutical preparations. Typical examples of prodrugs include organic phosphates or esters of alcohols or thioalcohols.

Prodrugs by definition are often biologically inert or substantially inactive forms of the parent or active compound. The rate of release of the active drug, i.e. the rate of hydrolysis, is influenced by several factors but especially by the type of bond joining the parent drug to the modifier. Care must be taken to avoid preparing prodrugs which are eliminated through the kidney or reticular endothelial system, etc. before a sufficient amount of hydrolysis of the parent compound occurs.

Incorporating a polymer as part of a prodrug system has been suggested to increase the circulating life of a drug. A brief overview of some previous work in the field is presented below.

Ohya, et al., *J. Bioactive and Compatible Polymers* Vol. 10 January, 1995, 51–66, discloses doxorubicin-PEG conjugates which are prepared by linking the two substituents via various linkages including esters. The molecular weight of the PEG used, however, is only about 5,000 at most. Thus, the in vivo benefits are not fully realized because the conjugates are substantially excreted prior to sufficient linkage hydrolysis.

Commonly-assigned PCT publication WO96/23794 describes bis-conjugates in which one equivalent of the hydroxyl-containing drug is attached to each terminal of the linear polymer. In spite of this advance, techniques which would further increase the payload of the polymer have been sought.

In commonly-assigned U.S. patent application Ser. No. 09/293,624, filed Apr. 16, 1999, the disclosure of which is incorporated herein by reference, therapeutic polymeric conjugates with double or even greater therapeutic payloads are disclosed. Specifically, the polymers which are substantially linear, are designed to include multifunctional groups on both the alpha and omega terminus which are adapted for receiving up to four or more equivalents of a biologically active agent. Further work in this field has been done to address the problems which can occur when attempting to achieve complete or stochiometric loading of some active ingredients onto the multi-armed polymers. In particular situations, it has been found that it would be desirable to be able to provide more predictable and reproducible high degrees of loading. Such can be the case especially when steric hindrance or the molecular shape of the active ingredient reduces the likelihood of repeatable relatively complete loading of each multi-armed terminal group.

The contents of each of the above-mentioned commonly-assigned patent applications and PCT international applications is incorporated herein by reference.

Thus, there continues to be a need to provide additional technologies for forming polymeric prodrugs of therapeutic moieties. The present invention addresses this need.

SUMMARY OF THE INVENTION

In one aspect of the invention, compounds of Formula (I) are provided:

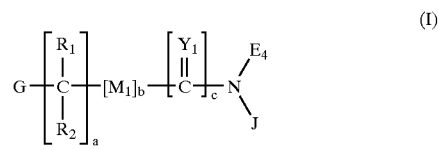

wherein:

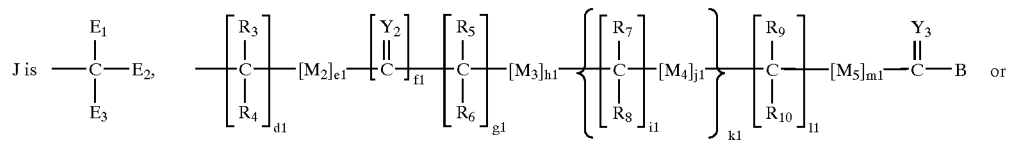

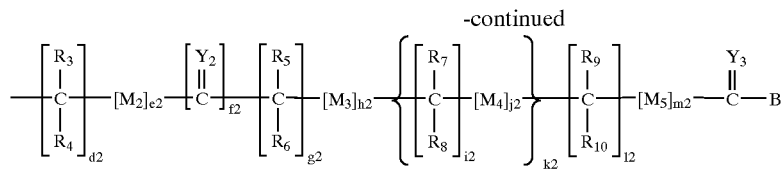

$E_{1-4}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

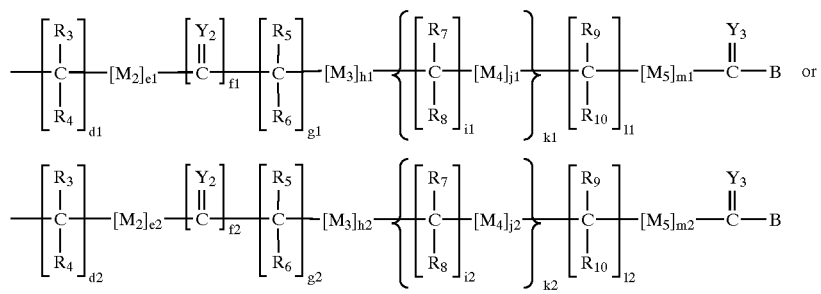

and at least one of $E_{1-4}$ includes a B moiety;

$E_{1a-3a}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

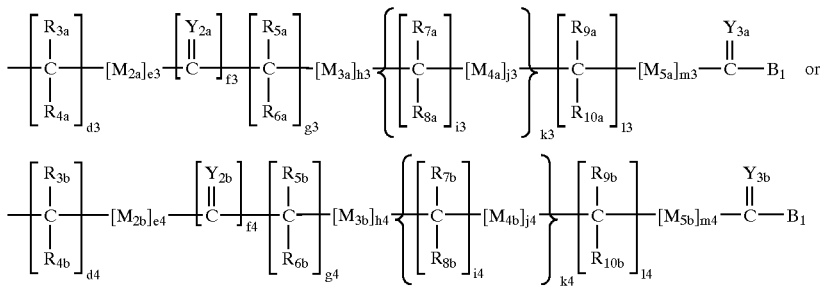

B is a leaving group, OH, a residue of a hydroxyl-containing moiety, a residue of an amine-containing moiety or

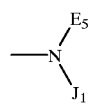

wherein $E_5$ is independently selected from the same group which defines $E_{1-4}$;

$J_1$ is 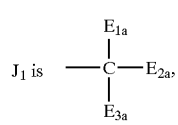

wherein $B_1$ is a leaving group, OH, a residue of a hydroxyl-containing moiety or a residue of an amine-containing moiety or

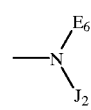

wherein $E_6$ is independently selected from the same group which defines $E_{1-4}$;

$J_2$ is 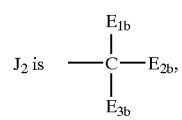

wherein $E_{1b-3b}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy, as anti-fungal compounds, including hydroxyl-containing triazoles, hydroxyl-containing echinocandins, hydroxyl-containing pneumocandins, etc, anti-cancer compounds such as camptothecin, paclitaxel, etoposide, anti-cancer

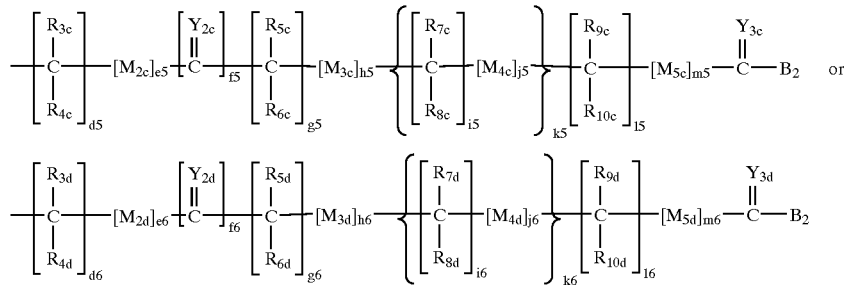

wherein $B_2$ is a leaving group, OH, a residue of a hydroxyl-containing moiety or a residue of an amine-containing moiety;

G is a polymeric residue;

$Y_{1-3}$, $Y_{2a-d}$ and $Y_{3a-d}$ are each independently O, S or $NR_{11a}$ $M_{1-4}$, $M_{2a-2d}$, $M_{3a-3d}$, and $M_{4a-4d}$ are each independently O, S or $NR_{11b}$;

$M_5$ and $M_{5a-d}$ are each independently X or Q, wherein X is an electron withdrawing group and Q is a moiety containing a free electron pair positioned three to six atoms from $C(=Y_3)$ or $C(=Y_{3a-d})$;

$R_{1-10}$, $R_{1a-11a}$, $R_{1b-11b}$, $R_{1c-10c}$ and $R_{1d-10d}$ are each independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy; and a, b, c, d1–d6, e1–e6, f1–f6, g1–g6, h1–h6, i1–i6, j1–j6, k1–k6, l1–l6, m1–m6 are each independently zero or a positive integer.

In preferred aspects of the invention, the polymeric residue is also substituted on the distal portion with another branching group to provide compounds of the formula (II):

(II)

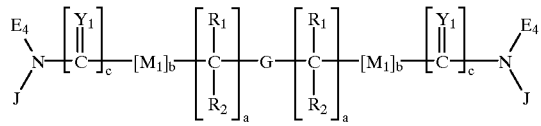

where all variables are as previously defined. Such bifunctional polymeric compounds allow the artisan to load anywhere from two up to sixteen, or more equivalents of a biologically active agent, e.g. drug or protein, etc., per polymer.

When B is a residue of a hydroxyl-containing moiety or an amine-containing moiety, each B is attached via a preferably hydrolyzable linkage which attaches to the polymer residue terminus.

Examples of hydroxyl-containing moieties for which one or more of improved aqueous solubility, decreased antigenicity, prodrug and/or controlled release delivery is desired include chemotherapeutic compound residues such as platinum compounds containing OH groups, floxuridine or podophyllotoxin.

Examples of amine-containing moieties for which one or more of improved aqueous solubility, decreased antigenicity, prodrug and/or controlled release delivery is desired include antimetabolites such as Ara-C or gemcitabine. In still further embodiments, other oncolytic agents, non-oncolytic agents such as anti-inflammatory agents, including steroidal compounds, protease inhibitors such as AZT, as well as therapeutic low molecular weight peptides such as insulin are also contemplated.

Alternatively, B can be an art recognized leaving group such as N-hydroxy-benzotriazolyl, N-hydroxyphthalimidyl, halogen, p-nitrophenoxy, imidazolyl, N-hydroxysuccinimidyl, thiazolidinyl thione, or other activating groups.

For purposes of the present invention, the term "residue" shall be understood to mean that portion of a biologically active compound which remains after the biologically active compound has undergone a substitution reaction in which the prodrug carrier portion has been attached.

For purposes of the present invention, the term "alkyl" shall be understood to include straight, branched, substituted, e.g. halo-, alkoxy-, and nitro-$C_{1-12}$ alkyls, $C_{3-8}$ cycloalkyls or substituted cycloalkyls, etc. "Halo" shall be understood to include, for example, fluoro, chloro, bromo, iodo.

For purposes of the present invention, the term "substituted" shall be understood to include adding or replacing one or more atoms contained within a functional group or compound with one or more different atoms.

The term "sufficient amounts" for purposes of the present invention shall mean an amount which achieves a therapeutic effect as such effect is understood by those of ordinary skill in the art.

One of the chief advantages of the compounds of the present invention is that the prodrugs have a more predictable degree of loading which is achieved by using the extender (or spacer) moieties described herein between the polymer residue ends and the parent therapeutic molecules. This is particularly useful in situations where prodrugs having higher payloads per unit of polymer are desired, e.g. tetramers, octamers, octadecimers (16), etc., and where it has proven difficult to consistently provide substantially fully loaded terminally branched polymers. The substantially uniform polymeric conjugates are thus easy to analyze and are highly reproducible. The rate of hydrolysis is also predictable and reproducible from batch to batch. Still, a further advantage is that in certain preferred embodiments, in which the polymer portion has a molecular weight of from about 20 to about 50 kDa, conjugates containing anti-tumor agents are believed to passively target tumors and thus enhance the effectiveness of the anti-tumor parent compound on solid tumors. While applicants are not bound by theory, it is believed that tumor proteases, alone and/or in combination with peptidases, cleave the covalent linkage between the polymer and active agent, thus freeing the parent active agent within the tumor.

Methods of making and using the compounds and conjugates described herein are also provided.

DETAILED DESCRIPTION OF THE INVENTION

A. Introduction

Figure 1:
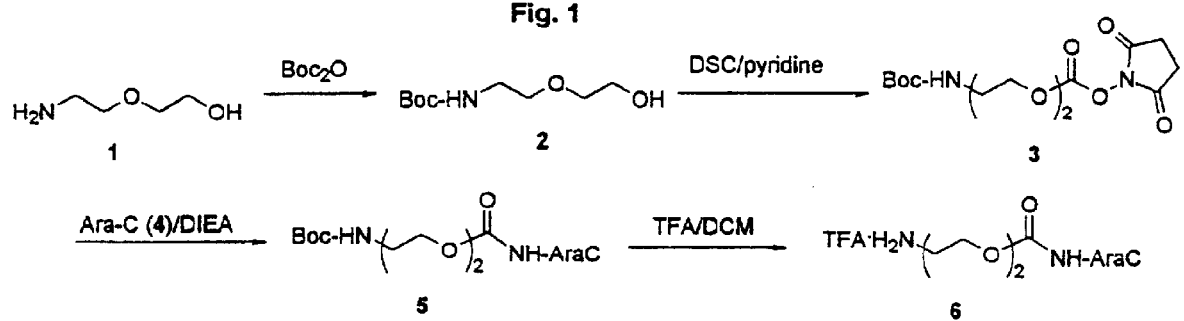
FIGS. 1–17 schematically illustrate the synthesis of compounds of the invention and those described in the Examples.
Figure 2:
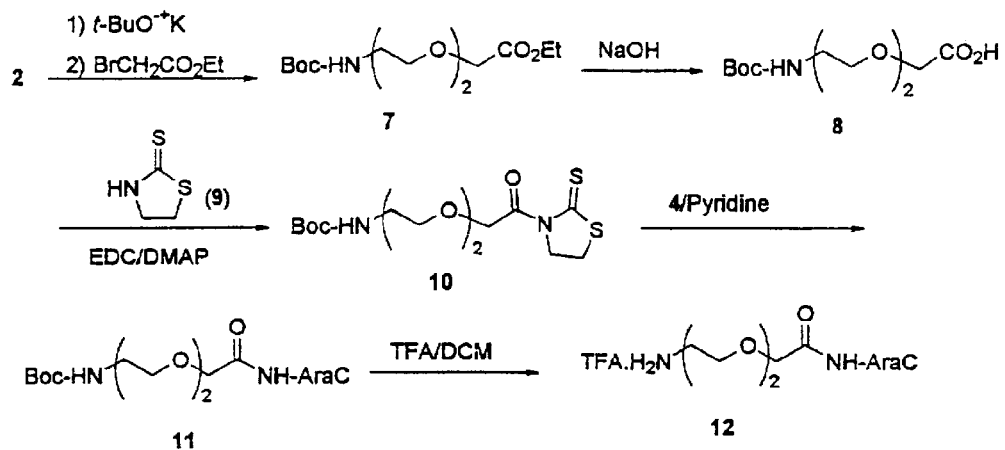
Figure 3:
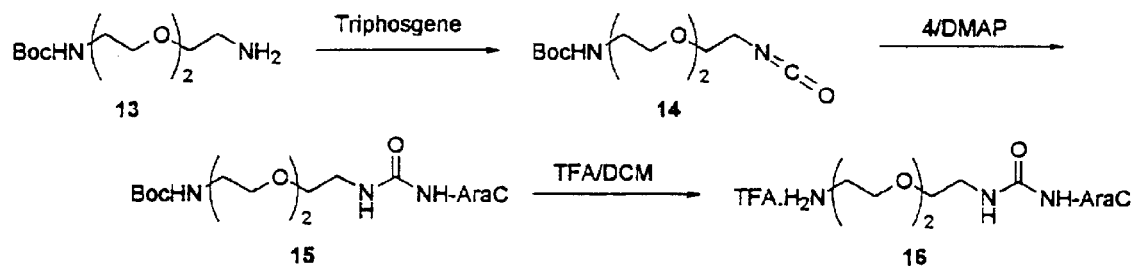
Figure 4:
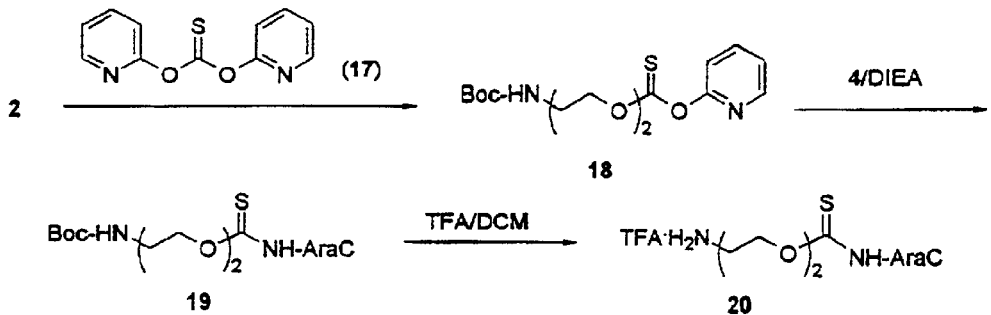
Figure 5:
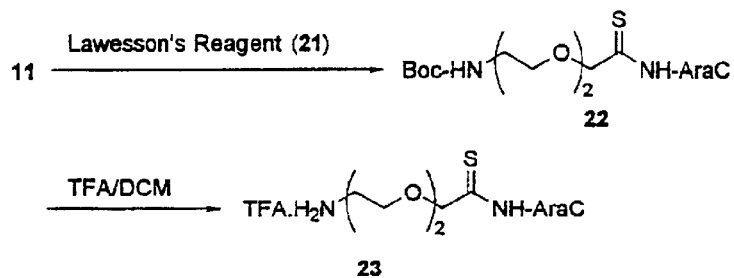
Figure 6:
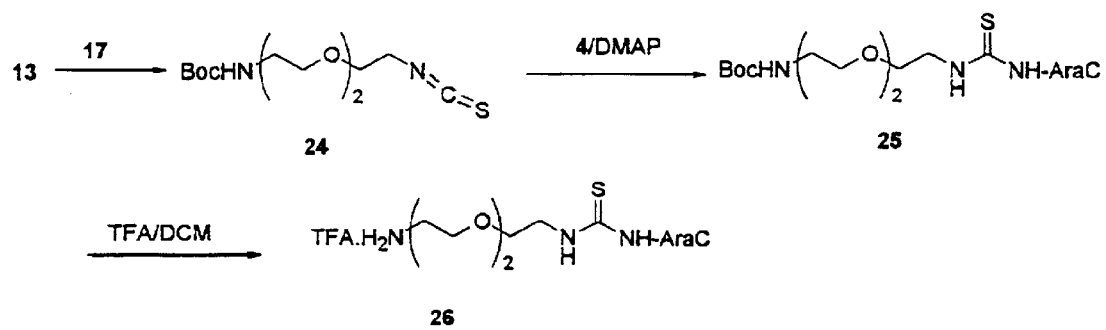
Figure 7:
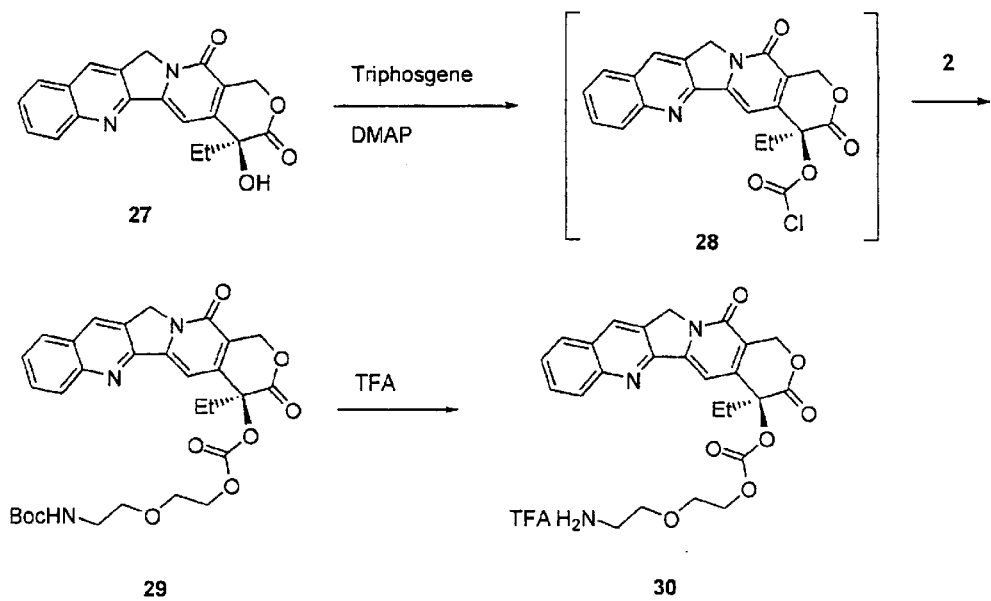
Figure 8:
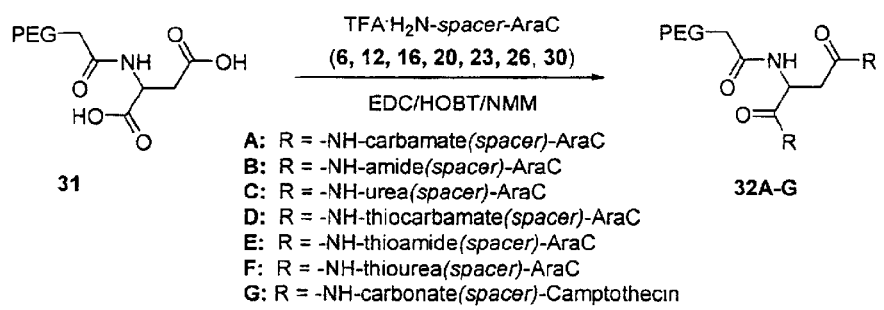
Figure 8:
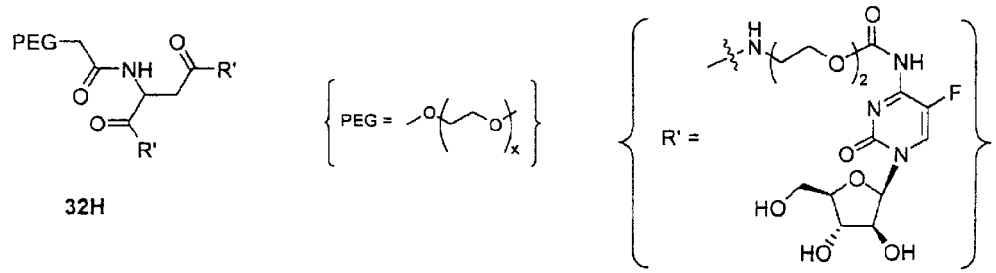
Figure 9:
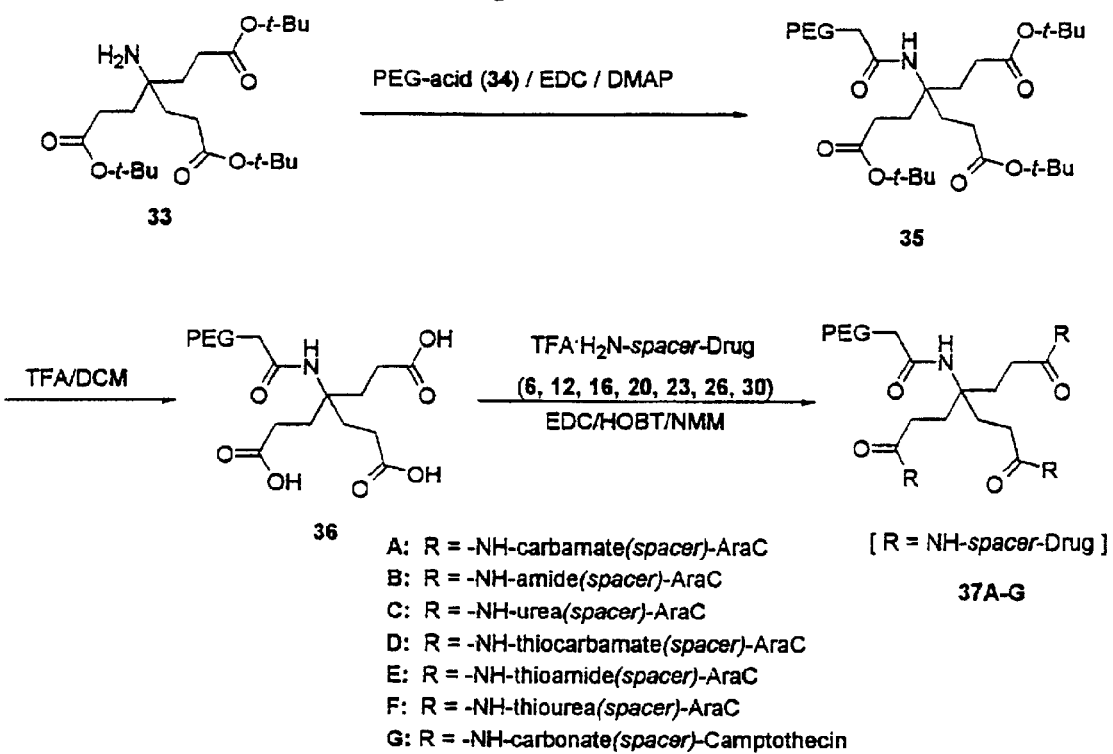
Figure 10:
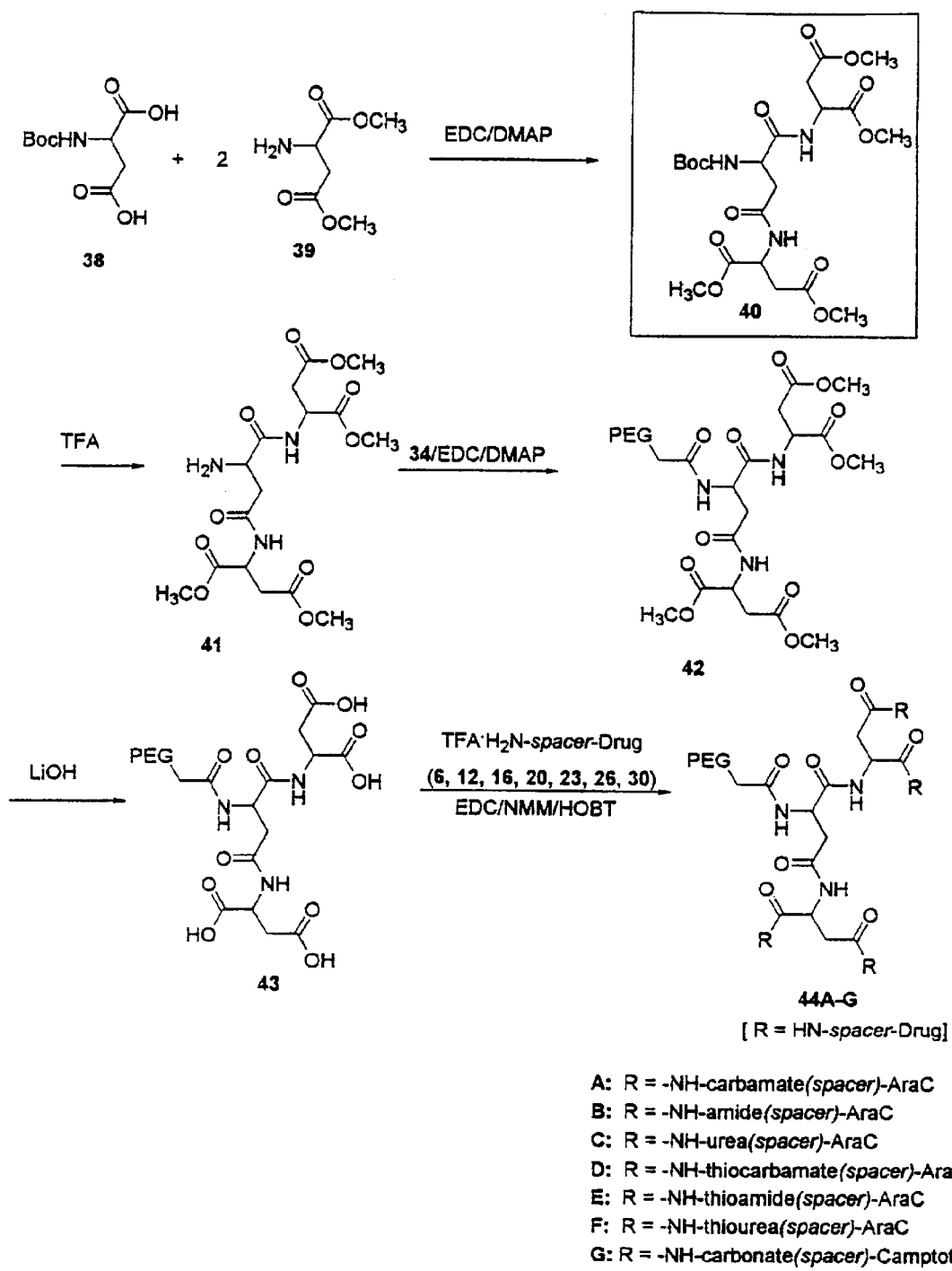
Figure 11:
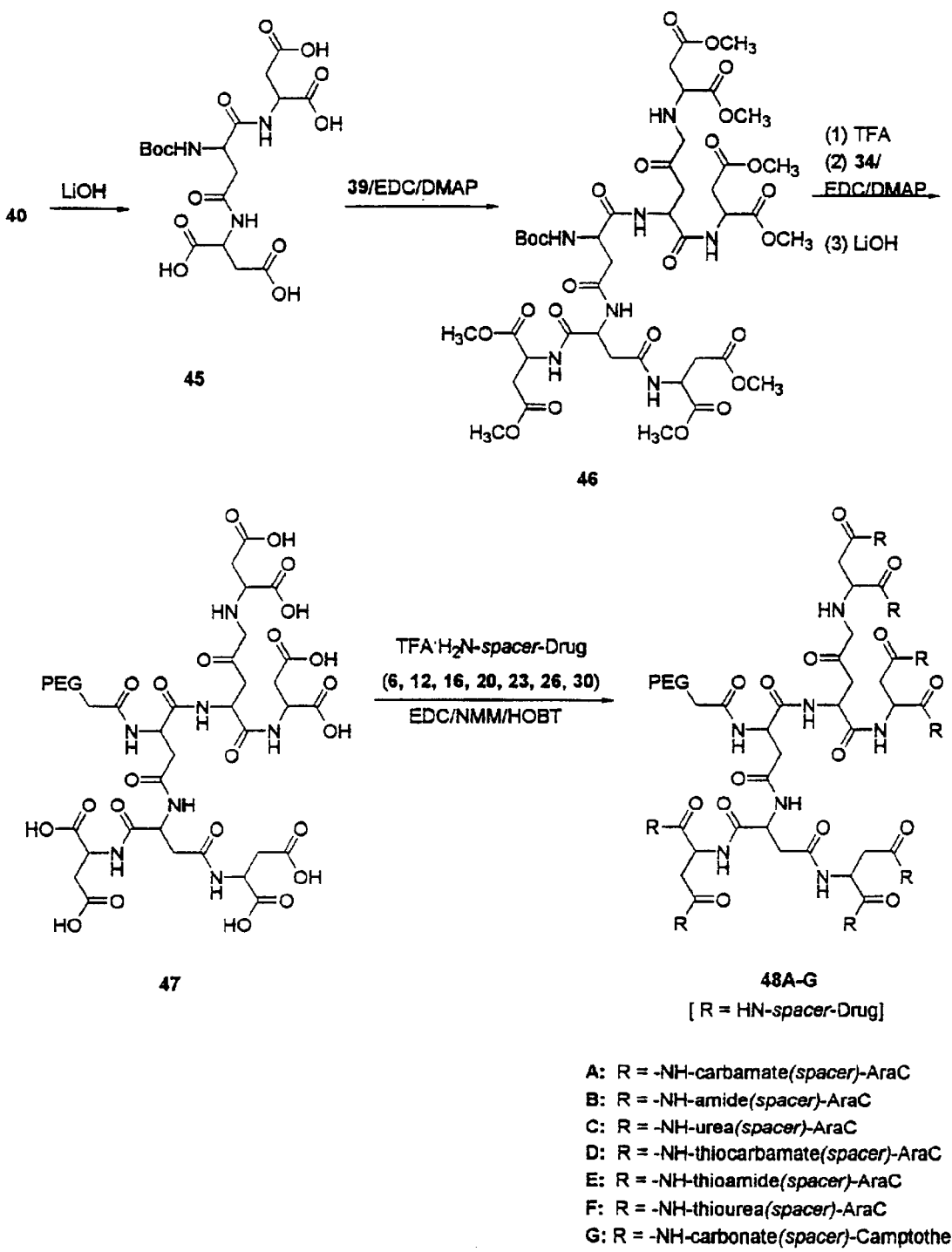
Figure 12:
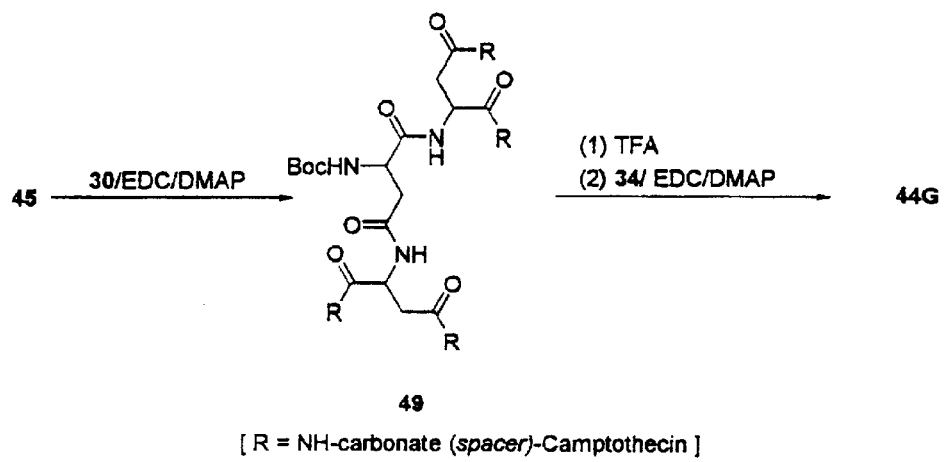
Figure 13:
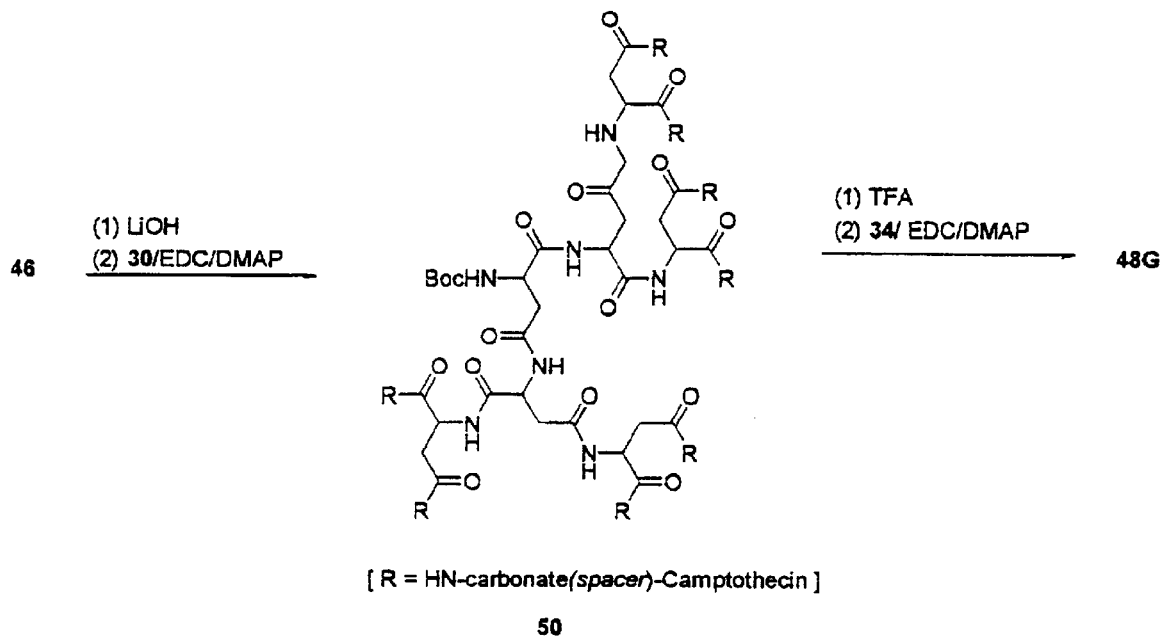

As pointed out in the Summary of the Invention section, compounds corresponding to formulae (I) and (II) are preferred. Furthermore, a, b, c, d1–d6, e1–e6, f1–f6, g1–g6, h1–h6, i1–i6, j1–j6, k1–k6, l1–l6, m1–m6 are preferably independently zero, one or two. The Y moieties are preferably oxygen and the $R_{1-10}$ moieties are preferably H or lower alkyl, i.e. $C_{1-4}$. The polymeric portion is discussed below.

B. Substantially Non-Antigenic Polymers

Within formulae (I) and (II), G is a polymer residue which is preferably substantially non-antigenic. In preferred aspects of the invention, the polymer residue is based on polyalkylene oxides such as poly(ethylene glycol) (PEG). The general formula for PEG and its derivatives is

where (x) represents the degree of polymerization (i.e. from about 10 to about 2,300) or number of repeating units in the polymer chain and is dependent on the molecular weight of the polymer, (A) is H or a capping group such as aminoalkyl, carboxyalkyl, haloalkyl, or other activating group and (A') is the same as (A) or another (A) moiety. In alternative aspects, the polymer residue is a poly(propylene glycol) (PPG). Thus, the G moiety residues are preferably O—$(CH_2CH_2O)_x$ or O—$(CH(CH_3)CH_2O)_x$, wherein x is the degree of polymerization.

Also useful are branched PEG derivatives such as those described in commonly-assigned U.S. Pat. No. 5,643,575, "star-PEG's" and multi-armed PEG's such as those described in Shearwater Polymers, Inc. catalog "Polyethylene Glycol Derivatives 1997–1998". The disclosure of each of the foregoing is incorporated herein by reference.

As an alternative to the preferred PAO-based polymers, other effectively non-antigenic, terminally functionalized polymers can be used if the same type of activation is employed as described herein for PAO's such as PEG. Those of ordinary skill in the art will realize that the foregoing list is merely illustrative and that all polymeric materials having the qualities described herein are contemplated. For purposes of the present invention, "effectively non-antigenic" and "substantially non-antigenic" shall be understood to include all polymeric materials understood in the art as being substantially non-toxic and not eliciting an appreciable immune response in mammals.

It will be understood by those of ordinary skill that the water-soluble polymer, e.g. PEG, can be terminally functionalized using standard organic synthesis techniques which are reported in the literature to add the desired leaving group for facilitating attachment of the polymer to the target or parent compound via reacting with an available amino or hydroxyl group. Alternatively, functionalized PEG's are available from commercial suppliers such as Aldrich Chemical Company of Milwaukee, Wis. Thus, the PEG can be terminally modified to include moieties of group A which include hydrogen, $CO_2H$, $C_{1-6}$ alkyl moieties and

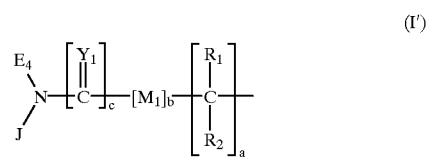

(I')

wherein a, b, c, $R_{1-2}$, $M_1$, $Y_1$, $E_4$ and J are the same as set forth above.

In order to provide the desired linkage, activated polymers such as PEG diacids can be used as well as PEG diamines and PEG diols. Suitable PAO acids can be synthesized by first converting PEG-OH to an ethyl ester followed by saponification. See also Gehrhardt, H., et al. Polymer Bulletin 18:487 (1987) and Veronese, F. M., et al., J. Controlled Release 10; 145 (1989). Alternatively, the PAO-acid can be synthesized by converting PEG-OH into a t-butyl ester followed by acid cleavage. See, for example, commonly assigned U.S. Pat. No. 5,605,976. The disclosures of each of the foregoing are incorporated by reference herein. Although PAO's and PEG's can vary substantially in number average molecular weight, polymers ranging from about 2,000 to about 100,000 are usually selected for the purposes of the present invention. Molecular weights of from about 5,000 to about 80,000 are preferred and 20,000 to about 50,000 are particularly preferred. The weight average molecular weight (Mw) of the polymer selected for inclusion in the prodrug must be sufficient so as to provide sufficient circulation of the prodrug before hydrolysis of the linker. Preferably, G is O—$(CH_2CH_2O)_x$ and x is a positive integer selected so that the Mw is at least about 20,000.

C. The Linkage Moieties

The M Groups

Within the Formulae (I) and (II), $M_{1-4}$, $M_{2a-2d}$, $M_{3a-3d}$, and $M_{4a-4d}$ d are each independently O, S or $NR_{11b}$; where $R_{11b}$ is as defined above and preferably is H or a lower (i.e. $C_{1-4}$) alkyl. $M_5$ and $M_{5a-d}$, on the other hand are each independently either an electron withdrawing group (X) such as O, S, SO, $SO_2$, or $NR_{11c}$ where $R_{11c}$ is H, $C_{1-6}$ alkyl, any of the other groups which comprise $R_{11a-b}$. In alternative aspects, $M_5$ and $M_{5a-d}$ can each be Q which represents a moiety containing a free electron pair positioned three to six atoms, and preferably five atoms, from the carbonyl e.g. C(=$Y_3$) or C(=$Y_{3a-d}$) closest to the biologically active moiety covalently attached to the polymer transport system. Q can be selected from the non-limiting list of cycloalkyls, aryls, aralkyl groups substituted with O, S or $NR_{11b}$, where $R_{11b}$ is preferably H, a $C_{1-6}$ alkyl or substituted $C_{1-6}$ alkyl. The free electron pair can be anywhere along the Q moiety as long as the defined spacing between the free electron pair and the C(=$Y_3$) is maintained. Thus, Q assists hydrolysis of the prodrug linkage by anchimeric assistance because the free electron pair can generate a three- to six-membered, but preferably five-membered, ring intermediate upon hydrolysis preferably of the ester linkage. $M_5$ and $M_{5a-d}$ are each preferably an (X) group such as O or NH.

D. Prodrug Candidates

In especially preferred embodiments, B is ara-C or a derivative thereof corresponding to the formula:

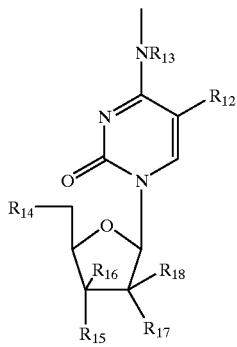

wherein $R_{12-13}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, halo, substituted aryls, aralkyls, $C_{1-6}$ heteroalkyls, substituted $C_{1-6}$ heteroalkyls;

$R_{14-18}$ are independently selected from alkoxy, e.g. $OR_{19}$ or, in the alternative, H, OH, $N_3$, $NHR_{20}$, $NHR_{20}$, $NO_2$ or CN, fluoro, chloro, bromo, iodo, where $R_{19-20}$ are independently selected from the same group which defines $R_{12-13}$ and is preferably H or a $C_{1-4}$ alkyl.

Residues of Amine-containing Compounds

In addition to the ara-C compounds described above, B can also be a residue of other amine-containing compounds, a non-limiting list of such suitable compounds includes residues of organic compounds, enzymes, proteins, polypeptides, etc. anti-anxiety agents, gastrointestinal agents, central nervous system-activating agents, analgesics, fertility agents, contraceptive agents, anti-inflammatory agents, steroidal agents, anti-urecemic agents, vasodilating agents, vasoconstricting agents, etc.

Suitable proteins, polypeptides, enzymes, peptides and the like having at least one available amino group for polymer attachment include materials which have physiological or pharmacological activities as well as those which are able to catalyze reactions in organic solvents. The only other requirement of the amine-containing materials is that they maintain at least some portion of the activity associated with the unmodified protein, enzyme, peptide, etc. either after attachment to the polymeric transport or, if relevant, after the parent compound has been hydrolyzed and released.

Proteins, polypeptides and peptides of interest include, but are not limited to, hemoglobin, serum proteins such as blood factors including Factors VII, VIII, and IX; immunoglobulins, cytokines such as interleukins, i.e. IL-1 through IL-13, α-, β- and γ-interferons, colony stimulating factors including granulocyte colony stimulating factors, platelet derived growth factors and phospholipase-activating protein (PLAP). Other proteins of general biological or therapeutic interest include insulin, plant proteins such as lectins and ricins, tumor necrosis factors and related proteins, growth factors such as transforming growth factors, such as TGFα's or TGFβ's and epidermal growth factors, hormones, somatomedins, erythropoietin, pigmentary hormones, hypothalamic releasing factors, antidiuretic hormones, prolactin, chorionic gonadotropin, follicle-stimulating hormone, thyroid-stimulating hormone, tissue plasminogen activator, and the like. Immunoglobulins of interest include IgG, IgE, IgM, IgA, IgD and fragments thereof Some proteins such as the interleukins, interferons and colony stimulating factors also exist in non-glycosylated form, usually as a result of using recombinant techniques. The non-glycosylated versions are also among the proteins of the present invention.

Enzymes of interest include carbohydrate-specific enzymes, proteolytic enzymes, oxidoreductases, transferases, hydrolases, lyases, isomerases and ligases. Without being limited to particular enzymes, examples of enzymes of interest include asparaginase, arginase, arginine deaminase, adenosine deaminase, superoxide dismutase, endotoxinases, catalases, chymotrypsin, lipases, uricases, adenosine diphosphatase, tyrosinases and bilirubin oxidase. Carbohydrate-specific enzymes of interest include glucose oxidases, glucodases, galactosidases, glucocerebrosidases, glucouronidases, etc.

Also included herein is any portion of a biological polymer demonstrating in vivo bioactivity. This includes amino acid sequences, nucleic acids (DNA, RNA), peptide nucleic acids (PNA), antibody fragments, single chain binding proteins, see, for example U.S. Pat. No. 4,946,778, disclosure of which is incorporated herein by reference, binding molecules including fusions of antibodies or fragments, polyclonal antibodies, monoclonal antibodies and catalytic antibodies.

The proteins or portions thereof can be prepared or isolated by using techniques known to those of ordinary skill in the art such as tissue culture, extraction from animal sources, or by recombinant DNA methodologies. Transgenic sources of the proteins, polypeptides, amino acid sequences and the like are also contemplated. Such materials are obtained from transgenic animals, i.e., mice, pigs, cows, etc., wherein the proteins are expressed in milk, blood or tissues. Transgenic insects and baculovirus expression systems are also contemplated as sources. Moreover, mutant versions of proteins, such as mutant interferons are also within the scope of the invention.

Other proteins of interest are allergen proteins such as ragweed, Antigen E, honeybee venom, mite allergen, and the like. The foregoing is illustrative of the proteins which are suitable for the present invention. It is to be understood that those proteins, as defined herein, not specifically mentioned but having an available amino group are also intended and are within the scope of the present invention.

In a preferred aspect of the invention, the amino-containing compound is a biologically active compound that is suitable for medicinal or diagnostic use in the treatment of animals, e.g., mammals, including humans, for conditions for which such treatment is desired. The foregoing list is meant to be illustrative and not limiting for the compounds which can be modified. Those of ordinary skill will realize that other such compounds can be similarly modified without undue experimentation. It is to be understood that those biologically active materials not specifically mentioned but having suitable amino-groups are also intended and are within the scope of the present invention.

Preferably, when it is desired that the amino-containing B moiety be released as part of a polymeric prodrug, it is desirable that the amine residue which is attached to the polymer also be in proximity to a highly electron-withdrawing moiety such as a pyramidimyl or purinyl or other heterocyclical aromatic or aromatic containing group containing an electron-withdrawing group such as $NO_2$, CF, etc. so that prodrug system releases and regenerates the parent compound.

Residues of Hydroxyl Containing Compounds a. Camptothecin and Related Topoisomerase I Inhibitors Camptothecin is a water-insoluble cytotoxic alkaloid produced by *Camptotheca accuminata* trees indigenous to China and *nothapodytes foetida* trees indigenous to India. Camptothecin and related compounds and analogs are also known to be potential anticancer or antitumor agents and have been shown to exhibit these activities in vitro and in vivo. Camptothecin and related compounds are also candidates for attachment to the polymeric systems of the present invention. Camptothecin and certain related analogues share the structure:

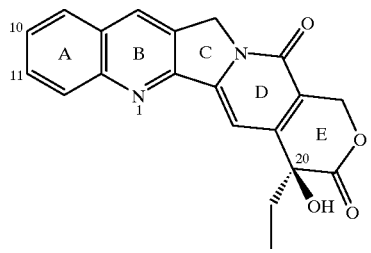

From this core structure, several known analogs have been prepared. For example, the A ring in either or both of the 10- and 11-positions can be substituted with an OH. The A ring can also be substituted in the 9-position with a straight or branched $C_{1-30}$ alkyl or $C_{1-17}$ alkoxy, optionally linked to the ring by a heteroatom i.e.—O or S. The B ring can be substituted in the 7-position with a straight or branched $C_{1-30}$ alkyl or substituted alkyl-, $C_{5-8}$ cycloakyl, $C_{1-30}$ alkoxy, phenyl alkyl, etc., alkyl carbamate, alkyl carbazides, phenyl hydrazine derivatives, amino-, aminoalkyl-, aralkyl, etc. Other substitutions are possible in the C, D and E rings. See, for example, U.S. Pat. Nos. 5,004,758; 4,943,579; Re 32,518, the contents of which are incorporated herein by reference. Such derivatives can be made using known synthetic techniques without undue experimentation. Preferred camptothecin derivatives for use herein include those which include a 20-OH or another OH moiety which is capable of reacting directly with activated forms of the polymer transport systems described herein or to the linking moiety intermediates, e.g. iminodiacetic acid, etc., which are then attached to a polymer such as PEG. Reference to camptothiecin analogs herein has been made for purposes of illustration and not limitation.

b. Taxanes and Paclitaxel Derivatives

For purposes of the present invention, the term "taxane" includes all compounds within the taxane family of terpenes. Thus, paclitaxcel, 3'-substituted tert-butoxy-carbonyl-amine derivatives (e.g. TAXOTERE™) and the like us well as other analogs which are readily synthesized using standard organic techniques or are available from commercial sources such as Sigma Chemical of St. Louis, Mo. are within the scope of the present invention. Representative taxanes are shown below.

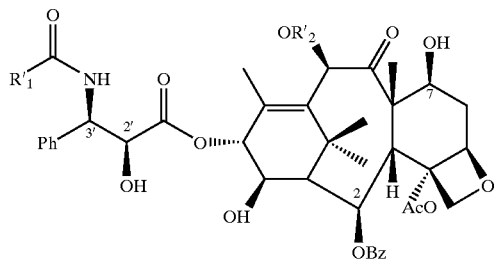

Paclitaxel: $R'_1 = C_6H_5$; $R'_2 = CH_3CO$; Taxotete: $R'_1 = (CH_3)_3CO$; $R'_2 = H$ These derivatives have been found to be effective anticancer agents. Numerous studies indicate that the agents have activity against several malignancies. To date, their use has been severely limited by, among other things, their short supply, poor water solubility and hypersensitivity. It is to be understood that other taxanes including the 7-aryl-carbamates and 7-carbamates disclosed in commonly assigned U.S. Pat. Nos. 5,622,986 and 5,547,981 can also be included in the prodrugs of the present invention. The contents of the foregoing U.S. patents are incorporated herein by reference. The only limitation on the taxane is that it must be capable of undergoing a hydroxyl based substitution reaction such as at the 2' position. Paclitaxel, however, is a preferred taxane.

c. Additional Biologically-Active OH-Containing Moieties

In addition to the foregoing molecules, the prodrugs of the present invention can be prepared using many other compounds. For example, biologically-active compounds such as podophyllotoxin:

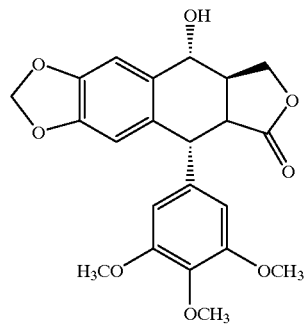

triazole-based antifungal agents such as fluconazole:

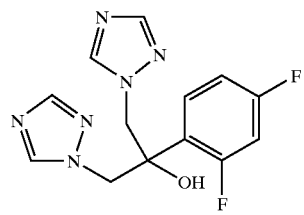

or ciclopirox:

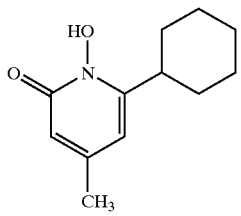

can be used.

The parent compounds selected for prodrug forms need not be substantially water-insoluble, although the polymer-based prodrugs of the present invention are especially well suited for delivering such water-insoluble compounds.

It is noted that parent compounds suitable for incorporation into the polymeric prodrug compositions of the invention, may themselves be substances/compounds which are not active after hydrolytic release from the linked composition, but which will become active after undergoing a further chemical process/reaction. For example, an anticancer drug that is delivered to the bloodstream by the polymeric transport system, may remain inactive until entering a cancer or tumor cell, whereupon it is activated by the cancer or tumor cell chemistry, e.g., by an enzymatic reaction unique to that cell.

After conjugation, the remaining portion of the amine-containing or hydroxyl-containing compound is referred to as the residue of the unconjugated compound.

E. Synthesis of the Polymeric Prodrug Transport System

The prodrugs of the present invention can be prepared in at least two general fashions. In the first method, the "spacer-drug" portion and the polymer containing terminal branches are prepared separately and thereafter combined. In the second method, the polymer residue is attached to the branching groups, the extender or spacer portions are coupled to the termini of the branching groups and thereafter, the biologically active moiety or drug, e.g. Drug-OH or Drug-NH$_2$ is attached thereto. Specific synthetic techniques are provided in the Examples.

The first synthetic pathway is now described with reference to the Figures. FIGS. 1–7 illustrate the formation of various the drug-spacer intermediates, all of which are embraced by the formula:

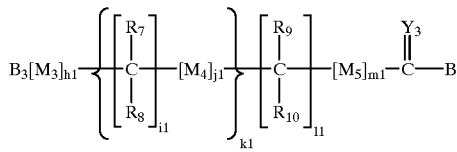

wherein

B is a residue of a biologically active amine-containing moiety or a hydroxyl-containing moiety;

$B_3$ is a cleavable protecting group;

$Y_3$ is O, S, or $NR_{11a}$;

$M_3$ and $M_4$ are independently O, S, or $NR_{11b}$;

$M_5$ is X or Q;

wherein X is an electron withdrawing group and Q is a moiety containing a free electron pair positioned three to six atoms from $C(=Y_3)$;

$R_{7-10}$ and $R_{11a-b}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;

h1-m1 are each independently zero or a positive integer. The cleavable protecting group $B_3$ is then removed and the resultant compound is reacted with the terminally branched polymer compound of the formula

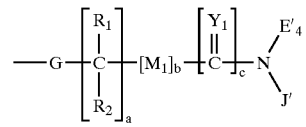

wherein

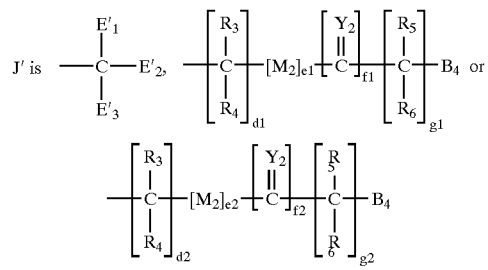

$E'_{1-4}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

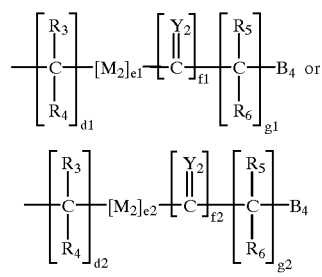

wherein $B_4$ is OH or a leaving group;

G is a polymer residue;

$Y_{1-2}$ are independently O, S, or $NR_{11a}$;

$M_{1-2}$ are independently O, S, or $NR_{11b}$;

$R_{1-6}$, $R_9$ and $R_{10}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;

a, b, c, $d_1$-$g_1$ and $d_2$-$g_2$ are each independently zero or a positive integer, whereby a polymeric conjugate is formed.

In the second technique, a biologically active moiety containing an unprotected amino or hydroxyl group is reacted with a terminally branched polymeric residue containing an extender or spacer moiety of the formula:

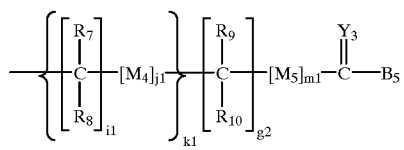

wherein:

$Y_3$ is O, S, or $NR_{11a}$;

$R_{7-10}$ and $NR_{11a}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;

$M_{4-5}$ are independently O, S, or $NR_{11b}$;

$B_5$ is OH or a leaving group capable of reacting with an unprotected amino or alkyl amino or hydroxyl group of a biologically active moiety; and i11-m1 are each independently zero or a positive integer, whereby a polymeric conjugate is formed.

Figure 14:
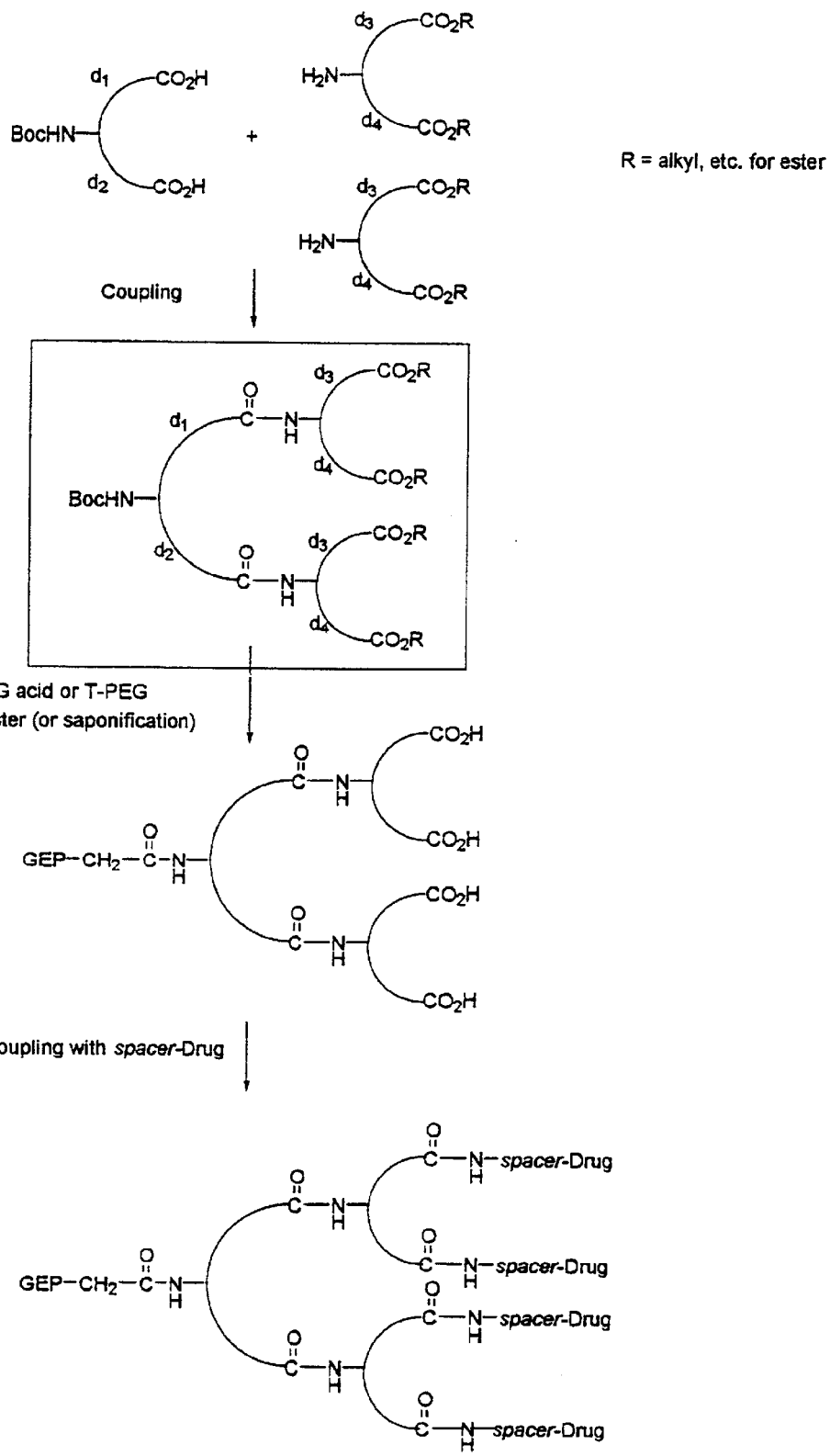
Figure 15:
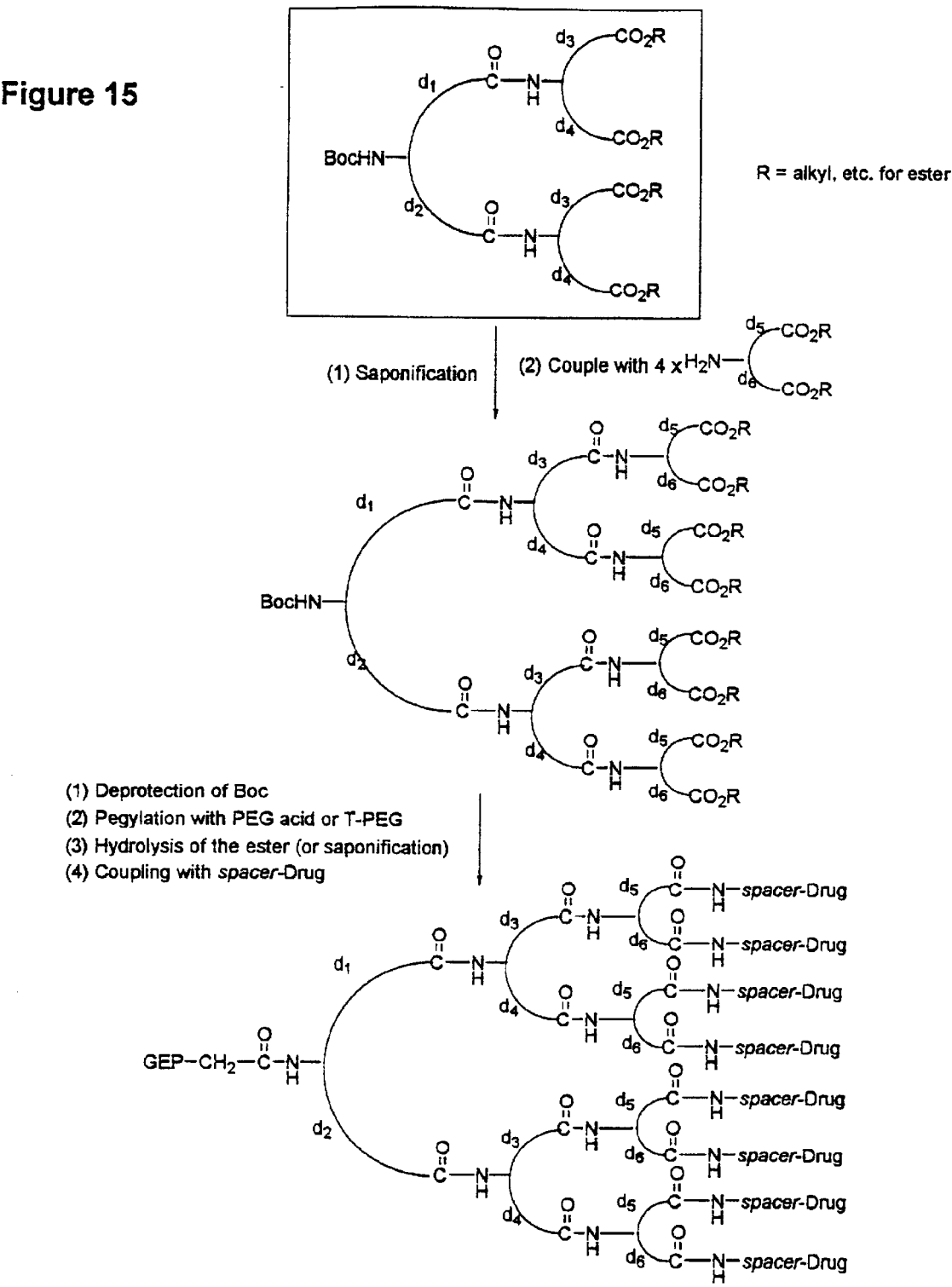
Figure 16:
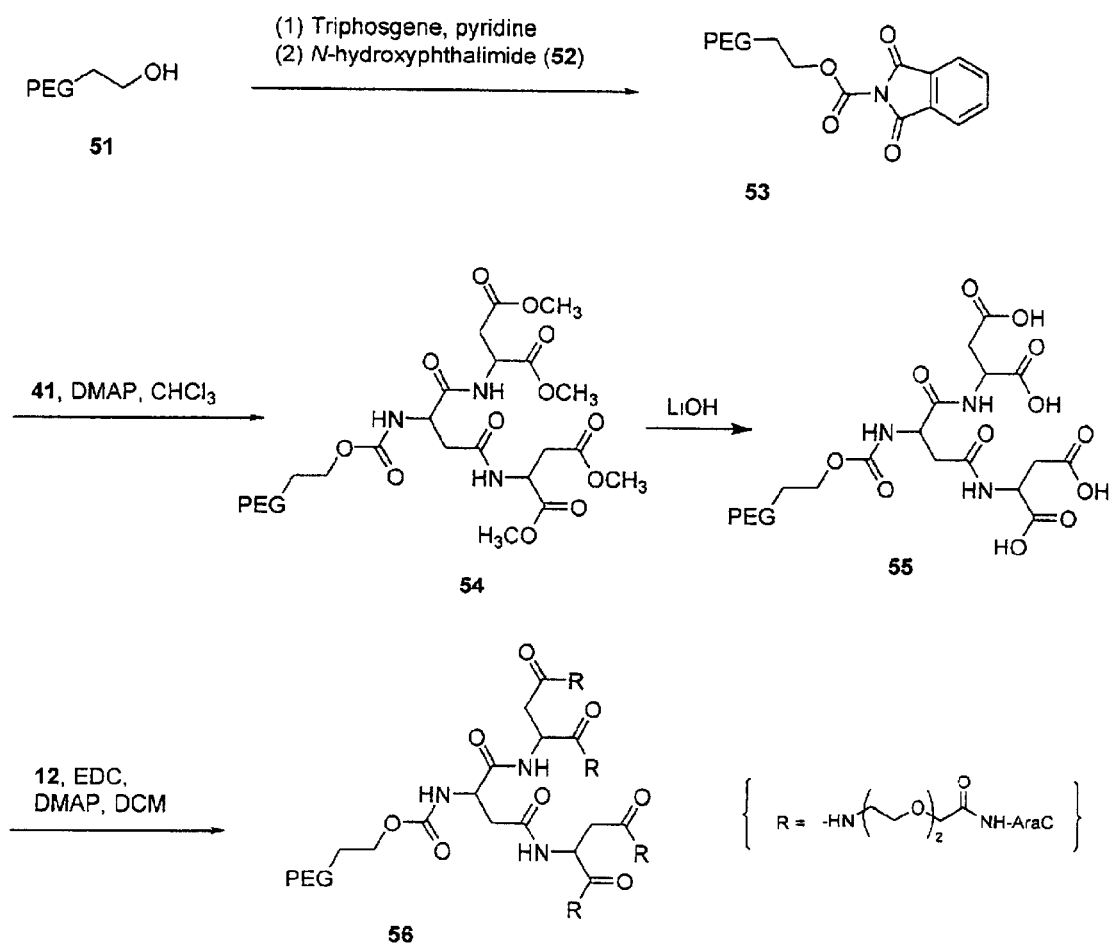
Figure 17:
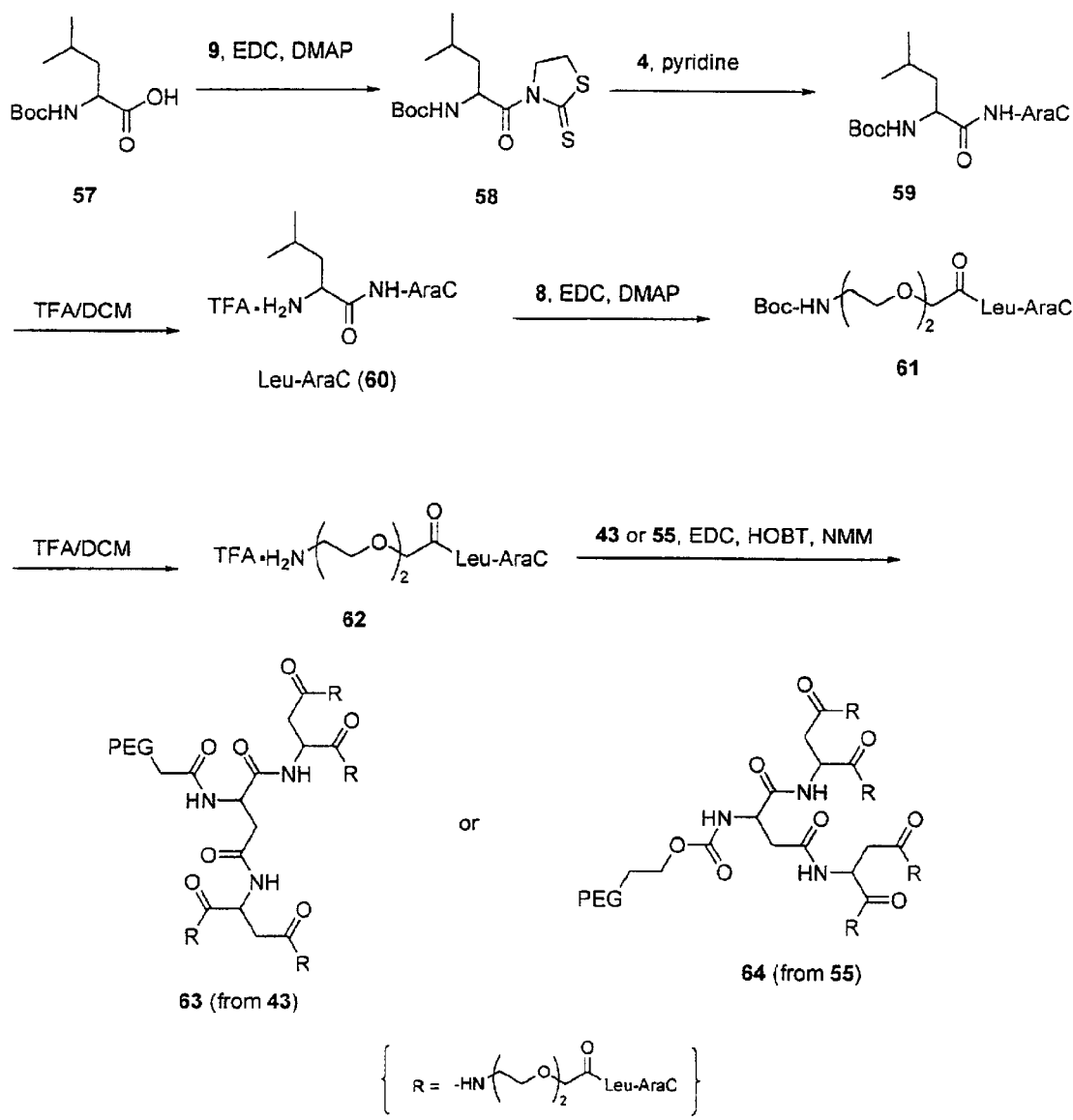

The terminally branched polymer portion can be prepared using the techniques described in U.S. patent application Ser. No. 09/293,624, filed Apr. 16, 1999, the contents of which are incorporated herein by reference. Additional techniques are provided in the examples and in FIGS. 14–15.

Suitable protecting groups useful for this purpose may be any of a variety of organic moieties known to those of ordinary skill in the art and include, without limitation, t-Boc (tert-butyloxycarbonyl), Cbz (carbobenzyloxy) and TROC (trichloroethoxycarbonyl). The cleavable protecting group is removed by treatment with a strong acid such as trifluoroacetic acid (TFA) or other haloacetic acid, HCl, sulfuric acid, etc., or by using catalytic hydrogenation. Examples of a leaving group which is capable of reacting with an unprotected amine, include activated carbonate moieties like p-nitrophenyl or succinimidyl carbonate; a thiazolidine thione or other art recognized activating group.

Attachment of the B moiety, e.g. Drug-OH or Drug-$NH_2$ can also be carried out in the presence of a coupling agent. A non-limiting list of suitable coupling agents include 1,3-diisopropylcarbodiimide (DIPC), any suitable dialkyl carbodiimides, 2-halo-1-alkyl-pyridinium halides, (Mukaiyama reagents), 1-(3-dimethylaminopropyl)-3-ethyl carbodiimide (EDC), propane phosphonic acid cyclic anhydride (PPACA) and phenyl dichlorophosphates, etc. which are available, for example from commercial sources such as Sigma-Aldrich Chemical, or synthesized using known techniques.

Preferably the substituents are reacted in an inert solvent such as methylene chloride, chloroform, toluene, DMF or mixtures thereof. The reaction also preferably is conducted in the presence of a base, such as dimethylaminopyridine, diisopropylethylamine, pyridine, triethylamine, etc. to neutralize any acids generated and at a temperature from 0° C. up to about 22° C. (room temperature).

Regardless of the synthesis selected, some of the preferred compounds which result from the synthesis techniques described herein include those found in claim 14.

G. Methods of Treatment

Another aspect of the present invention provides methods of treatment for various medical conditions in mammals. The methods include administering to the mammal in need of such treatment, an effective amount of a polymer conjugate, such as an ara-C-PEG conjugate, which has been prepared as described herein. The compositions are useful for, among other things, treating neoplastic disease including leukemias, reducing tumor burden, preventing metastis of neoplasms and preventing recurrences of tumor/neoplastic growths in mammals.

The amount of the polymer conjugate administered will depend upon the specific ara-C molecule included therein. Generally, the amount of prodrug used in the treatment methods is that amount which effectively achieves the desired therapeutic result in mammals. Naturally, the dosages of the various prodrug compounds will vary somewhat depending upon the parent compound, rate of in vivo hydrolysis, molecular weight of the polymer, etc. In general, however, prodrug ara-C is administered in amounts ranging from about 5 to about 5,000 $mg/m^2$ per day, based on the amount of the ara-C moiety. Gemcitabine polymer conjugates prodrugs are also administered in amounts ranging from about 5 to about 2,000 $mg/m^2$ per day. The range set forth above is illustrative and those skilled in the art will determine the optimal dosing of the selected prodrug based on clinical experience and the treatment indication. Actual dosages will be apparent to the artisan without undue experimentation.

The prodrugs of the present invention can be included in one or more suitable pharmaceutical compositions for administration to mammals. The pharmaceutical compositions may be in the form of a solution, suspension, tablet, capsule or the like, prepared according to methods well known in the art. It is also contemplated that administration of such compositions may be by the oral and/or parenteral routes depending upon the needs of the artisan. A solution and/or suspension of the composition may be utilized, for example, as a carrier vehicle for injection or infiltration of the composition by any art known methods, e.g., by intravenous, intramuscular, subdermal injection and the like.

Such administration may be also be by infusion into a body space or cavity, as well as by inhalation and/or intranasal routes. In preferred aspects of the invention, however, the prodrugs are parenterally administered to mammals in need thereof

EXAMPLES

The following examples serve to provide further appreciation of the invention but are not meant in any way to restrict the effective scope of the invention. The underlined and bold-faced numbers recited in the Examples correspond to those shown in the Figures.

General. All reactions were run under an atmosphere of dry nitrogen or argon. Commercial reagents were used without further purification. All PEG compounds were dried under vacuum or by azeotropic distillation (toluene) prior to use. $^1H$ spectra were obtained with a JEOL FT NMR System JNM GSX-270 or Varian MercuryVX-300 instrument using deuteriochloroform as solvent unless specified.

$^{13}C$ NMR spectra were obtained at 67.80 MHz on the JNM GSX-270 or 75.46 MHz on the Varian MercuryVX-300. Chemical shifts (δ) are reported in parts per million (ppm) downfield from tetramethylsilane (TMS) and coupling constants (J values) are given in hertz (Hz). All PEG conjugated compounds were dissolved (~15 mg/mL) in sterile saline (0.9%) for injection prior to in vivo drug treatments and were given as their ara-C equivalents (absolute amount of ara-C given).

HPLC Method. Analytical KPLC's were performed using a C8 reversed phase column (Beckman, ultrasphere) under isocratic conditions with an 80:20 mixture (v/v) of methanol-water as mobile phase. Peak elutions were monitored at 254 nm using a UV detector. To detect the presence of any free PEG and also to confirm the presence of pegylated product, an evaporative light scattering detector (ELSD), Model PL-EMD 950 (Polymer Laboratories), was employed. Based on ELSD and UV analysis, all the final pegylated products were free of native drug and were ≧95% pure by HPLC.

Analysis of Ara-C Content in PEG Derivatives. For the determination of the ara-C content in PEG derivatives, $N^4$-acetylcytidine was used as the basis because of the absorbance change due to the acylation of ara-C. The Uv absorbance of $N^4$-acetylcytidine in $H_2O$ was determined at 257 nm for six different concentrations ranging from 0.01 μmo/mL to 0.05 μmol/mL. From the standard plot of absorbance vs. concentration, the absorption coefficient, ε, of $N^4$-acetylcytidine was calculated to be 36.4 (O.D. at 257 nm for 1 mg/mL with 1.0 cm light path). Pegylated ara-C derivatives were dissolved in $H_2O$ at an approximate concentration of 0.015 μmol/mL (based on a MW of 40 kDa) and the UV absorbance of these compounds at 257 nm was determined. Using this value and employing the absorption coefficient, ε, obtained from the above, the concentration of ara-C in the sample was determined. Dividing this value by the sample concentration provided the percentage of ara-C in the sample. See also, Greenwald, R. B., et al., "Drug Delivery Systems: Water Soluble Taxol 2-Poly(ethylene glycol) Ester Prodrugs-Design and In Vivo Effectiveness." *J Med. Chem.* 1996, 39, 424–431, the contents of which are incorporated herein by reference.

Determination of Rates of Hydrolysis of PEG Prodrugs. The rates of hydrolysis were obtained by employing a C8 reversed phase column (Zorbax SB-C8) using a gradient mobile phase consisting of (a) 0.1 M triethylammonium acetate buffer and (b) acetonitrile. A flow rate of 1 mL/minute was used, and chromatograms were monitored using a UV detector at 254 nm for daunorubicin and 280 nm for ara-C. For hydrolysis in buffer, PEG derivatives were dissolved in 0.1 M pH 7.4 PBS at a concentration of 5 mg/mL, while for hydrolysis in plasma, the derivatives were dissolved in distilled water at a concentration of 20 mg/100 μL and 900 μL of rat plasma was added to this solution. The mixture was vortexed for 2 minutes and divided into 2 mL glass vials with 100 μL of the aliquot per each vial. The solutions were incubated at 37° C. for various periods of time. A mixture of methanol-acetonitrile (1:1, v/v, 400 μL) was added to a vial at the proper interval and the mixture was vortexed for 1 minute, followed by filtration through 0.45 mm filter membrane (optionally followed by a second filtration through 0.2 mm filter membrane). An aliquot of 20 μL of the filtrate was injected into the HPLC. On the basis of the peak area, the amounts of native compound and PEG derivative were estimated, and the half-life of each compound in different media was calculated using linear regression analysis from the disappearance of PEG derivative. Abbreviations. DCM (dichloromethane), DIEA (N,N-diisopropylethylamine), DMAP (4-(dimethylamino) pyridine), DSC (N,N-disuccinimidyl carbonate), EDC (1-ethyl-3-(3-dimethylaminopropyl)carbodiimid HOBT (1-hydroxybenzotriazole), IPA (2-propanol), NMM (N-methylmorpholine), TFA (trifluoroacetic acid).

Example 1

2-(2-Boc-aminoethoxy)-ethanol (2)

This compound was prepared by a modification of the procedure described by, Lebeau, L, et al., "Synthesis of New Phospholipids Linked to Steroid-Hormone Derivatives Designed for Two-Dimensional Crystallization of Proteins," *Helv. Chim. Acta* 1991, 74, 1697–1706, the contents of which are incorporated herein by reference. A solution of di-tert-butylcarbonate (10.27 g, 47.2 mmol) in chloroform (40 mL) was added to a solution of 2-(2-aminoethoxy)-ethanol (1, 5.0 g, 47.62 mmol) in chloroform (40 mL) and the mixture was stirred at room temperature for 1.5 hours. The solution was washed with water (30 mL) and the organic layer was dried over anhydrous $MgSO_4$ and concentrated in vacuo to give the product (9.6 g, 99%): $^1H$ NMR δ1.45(s, 9H, t-Bu), 3.32 (m, 2H, $NHCH_2$), 3.43 (bs, 1H, OH), 3.56 (m, 4H, $CH_2OCH_2$), 3.73 (t, 2H, J=5.4, $CH_2OH$), 5.43 (bs, 1H, NH); $^{13}C$ NMR δ28.21 40.21, 61.31, 70.08, 72.14, 77.18, 79.06, 156.06.

Example 2

2-(2-Boc-aminoethoxy)-ethanol NHS carbonate (3)

A mixture of 2 (1.0 g, 4.88 mmol), DSC (1.5 g, 5.86 mmol), and anhydrous pyridine (474 mg, 6.0 mmol) in anhydrous chloroform (25 mL) was stirred at 25–30° C. overnight. The reaction mixture was washed with 0.5 N HCl then dried over anhyd $MgSO_4$. Evaporation of the solvent gave the product (1.5 g, 96%): $^1H$ NMR δ1.45(s, 9H, t-Bu), 2.84 (bs, 4H, NHS), 3.32 (m, 2H, $NHCH_2$), 3.56 (t, 2H, J=4.9, $CH_2O$), 3.74 (t, 2H, J=4.3, $OCH_2$), 4.47 (t, 2H, J=4.3, $CH_2OC(=O)ONHS$), 5.01 (br s, 1H, NH); $^{13}C$ NMR δ25.00, 27.92, 39.81, 67.57, 69.59, 69.89, 77.20, 78.56, 151.18, 155.58, 168.60.

Example 3

2-(2-Boc-aminoethoxy)-ethanol Ara-C carbamate (5)

A mixture of 3 (1.0 g, 3.13 mmol), ara-C (4, 760 mg, 3.13 mmol), and DIEA (605 mg, 4.69 mmol) in anhydrous DMF (50 mL) and anhydrous pyridine (20 mL) was stirred at 35–40° C. overnight. The reaction mixture was concentrated and the residue purified by silica gel column chromatography (100% ethyl ether→20% MeOH in $CHCl_3$) to give 201.8 mg (14%) of product: $^{13}C$ NMR δ25.34, 28.26, 40.10, 61.52, 64.85, 68.44, 70.02, 75.06, 79.28, 85,17, 92.40, 146.41, 152.74, 155.69, 156.27, 162.63, 173.82.

Example 4

2-(2-Aminoethoxy)-ethanol Ara-C carbamate TFA salt (6)

Compound 4 (210 mg, 0.44 mmol) was dissolved in TFA (2 mL) and DCM (4 mL) and the solution was stirred at room temperature for 1.5 hours. The solvent was removed in vacuo and the residue crystallized from DCM-ether to give 200 mg (93%) of product: $^{13}C$ NMR ($CD_3OD+CDCl_3$) δ24.61, 38.85, 60.52, 62.23, 66.03, 68.12, 74.59, 76.01, 85.39, 87.56, 94.10, 115.72 (q), 146.84, 152.28, 153.78, 160.33, 160.62 (q), 160.91, 161.60, 173.05.

Example 5

2-(2-Boc-aminoethoxy)-ethoxy]-acetic acid ethyl ester (7)

To a solution of 2 (4.5 g, 24.39 mmol) in toluene (100 mL) was added 1.0M potassium t-butoxide in t-butanol (36.6 μL, 36.6 mmol) at −10 to −20° C. for 1.5 hours and followed by addition of ethyl bromoacetate (8.146 g, 48.78 mmol). The resulting mixture was stirred for 3 hours at 10 to 20° C., followed by the addition of 0.25 N HCl (50 mL). The organic layer was separated and dried over anhydrous $MgSO_4$. The solvent was removed and the residue purified with silica gel column chromatography (30 to 50 % ethylacetate in hexane) to give 4.0 g (63%) of product: $^1H$ NMR δ1.29 (t, 3H, J=7.29, $CH_2CH_3$), 1.44 (s, 9H, Boc), 3.31 (m, 2H, $CH_2CH_2$), 3.55 (m, 2H, $CH_2CH_2$), 3.66–3.75 (m, 4H, $CH_2CH_2$), 4.14 (s, 2H, $CH_2C(=O)O$), 4.22 (q, 2H, j=7.29, $CH_2CH_3$), 5.20 (br s, 1H, NH); $^{13}C$ NMR δ13.85, 28.06, 40.04, 60.44, 68.29, 69.94, 70.52, 78.68, 155.72, 170.02. Anal. ($C_{13}H_{25}NO_6 \cdot 1/4H_2O$) C, H, N.

Example 6
[2-(2-Boc-aminoethoxy)-ethoxy]-acetic acid (8)

A solution of NaOH (5.0 g, 0.125 mol) in $H_2O$ (5 mL) and ethanol (50 mL, added after NaOH is dissolved in water) was added slowly to a solution of 7 (4.0 g, 0.014 mol) in ethanol (40 mL) in an ice bath and the temperature was kept <20° C. during the addition. After the addition the mixture was stirred for 2 hours, followed by acidification with 6N HCl to adjust pH to 2.5 with cooling. The mixture was filtered and the filter cake was washed with ethanol. The filtrate was concentrated in vacuo and the residue was partitioned between $DCM/H_2O$ to give the product (2.55 g, 75%): $^1$H NMR δ1.45 (s, 9H, Boc), 3.31 (m, 2H, $CH_2CH_2$), 3.55 (m, 2H, $CH_2CH_2$), 3.66–3.75 (m, 4H $CH_2CH_2$), 4.20 (s, 2H, $CH_2C$(=O)O), 5.20 & 6.25 (br s, 1H, NH), 5.31 (s, 1H, COOH); $^{13}$C NMR δ28.21, 40.15, 53.32, 68.20, 70.12, 70.77, 79.55, 80.05, 156.12, 173.38.

Example 7
(2-{2-[2-Oxo-2-(2-thioxo-thiazolidin-3-yl)-ethoxy]-ethoxy}-ethyl)-carbamic acid tert-butyl ester (10)

A mixture of 8 (2.5 g, 9.506 mmol), 2-mercaptothiazoline (9, 2.262 g, 19.012 mmol), EDC.HCl (3.65 g, 19.012 mmol), and DMAP (4.639 g, 38.024 mmol) in DCM (150 mL) was stirred at 0° C. to room temperature overnight. The solution was diluted with DCM (100 mL) and washed with 1% $NaHCO_3$ (100 mL) followed by 0.5 N HCl (100 mL×2). The organic layer was dried over anhyd $MgSO_4$ and the solvent was removed to give the crude product which has 2-mercaptothiazoline: $^{13}$C NMR δ27.74, 28.06, 29.24, 40.02, 53.32, 55.23, 69.80, 69.97, 70.45, 73.17, 79.05, 155.70, 171.52, 200.96.

Example 8
$N^4$-[2-(2-Boc-aminoethoxy)-ethoxy]-acetic acid amide ara-C (11)

A mixture of 10 (748.3 mg, 2.06 mmol) and 4 (1.5 g, 6.17 mmol) in anhydrous pyridine (60 mL) was stirred at 30–35° C. overnight. The solvent was removed and the residue was dissolved in minimum amount of DMF to be purified by silica gel column chromatography to give product (250 mg, 25%): $^{13}$C NMR δ28.23, 39.98, 61.41, 68.05, 69.56, 70.08, 70.25, 71.03, 75.01, 77.20, 79.06, 85.25, 87.88, 96.05, 146.96, 155.73, 156.31, 161.46, 170.78.

Example 9
$N^4$-[2-(2-aminoethoxy)-ethoxy]-acetic acid amide ara-C TFA salt (12)

Prepared from 11 in 99% yield as described for the preparation of 6: $^{13}$C NMR ($CDCl_3+CD_3OD$) δ38.63, 60.05, 66.45, 69.19, 69.39, 70.55, 74.56, 85.45, 87.62, 95.05, 115.72 (q), 146.96, 155.47, 160.91, 170.86.

Example 10
Urea derivative of ara-C: Compound (15)

Triphosgene (308.2 mg, 1.04 mmol) and pyridine (307.1 mg, 3.88 mmol) are added to a solution of 2-amino-2'-Boc-aminoethylene glycol diethyl ether using a procedure similar to that described by Zuckermann, R. N., et al., "Discovery of Nanomolar Ligands For 7-Transmembrane G-Protein-Coupled Receptors From A Diverse N-(Substituted) Glycine Peptoid Library," *J. Med. Chem.* 1994, 37, 2678–2685, the contents of which are incorporated herein by reference. (13, 384.4 mg, 1.55 mmol) in chloroform (30 mL) and the mixture is stirred at 35–40° C. for 3 h followed by cooling to room temperature. Compound 4 (942.8 mg, 3.88 mmol) and DMAP (474 mg, 3.88 mmol) are added to the solution of isocyanate, 14, and the mixture is stirred at 35–40° C. overnight. The reaction solution is washed with 0.5 N HCl (3×10 mL), water (10 mL) and dried over anhyd $MgSO_4$, followed by removal of the solvent in vacuo. The residue is purified by silica gel column chromatography (0→20% MeOH in $CHCl_3$) to give product.

Example 11
TFA salt of Urea derivative: Compound (16)

Compound 15 is subjected to the conditions as described for the preparation of 6 to give 16.

Example 12
2-(2-Boc-aminoethoxy)-ethanol 2-pyridyl thiocarbonate (18)

A mixture of 2 (1.0 g, 4.88 mmol), di-2-pyridyl thionocarbonate prepared as described by Kim, S., et al., "Di-2-pyridyl Thionocarbonate. A New Reagent For The Preparation Of Isothiocyanates And Carbodiimides," *Tet. Left.* 1985, 26, 1661–1664, the contents of which are incorporated herein by reference, (17, 1.36 g, 5.86 mmol), and anhydrous pyridine (474 mg, 6.0 mmol) in anhydrous chloroform (25 mL) is stirred for 3 hours at room temperature. The reaction mixture is washed with 0.5 N HCl then dried over anhydrous $MgSO_4$, followed by evaporation of the solvent to give the product.

Example 13
2-(2-Boc-aminoethoxy)-ethanol 2-pyridyl thiocarbamate ara-C (19)

Compound 18 is subjected to the conditions as described for the preparation of 5 to give 19.

Example 14
2-(2-Aminoethoxy)-ethanol 2-pyridyl thiocarbamate ara-C TFA salt (20)

Compound 19 is subjected to the conditions as described for the preparation of 6 to give 20.

Example 15
$N^4$-[2-(2-Boc-aminoethoxy)-ethoxy]-acetic acid thioamide ara-C (22)

A mixture of 11 (0.5 g, 1.024 mmol) and Lawesson's reagent, see Cava, M. P., et al, "Thionation Reactions of Lawesson's Reagents," *Tetrahedron* 1985, 41, 5061–5087, the contents of which are incorporated herein by reference, (248.4 mg, 0.61 mmol) in TMF (10 mL) is refluxed for 5 hours and the solvent is removed in vacuo. The residue is purified by silica gel column chromatography (0→20% MeOH in $CHCl_3$) to give product.

Example 16
$N^4$-[2-(2-Aminoethoxy)-ethoxy]-acetic acid thioamide ara-C TFA salt (23)

Compound 22 is subjected to the conditions as described for the preparation of 6 to give 23.

Example 17
Thiourea derivative of ara-C: Compound (25)

Compound 17 (241.6 mg, 1.04 mmol) and pyridine (307.1 mg, 3.88 mmol) are added to a solution of 13 (384.4 mg, 1.55 mmol) in chloroform (30 mL) and the mixture is stirred at room temperature for 3 hours. Compound 4 (942.8 mg, 3.88 mmol) and DMAP (474 mg, 3.88 mmol) are added to the solution of isothiocyanate, 24, and the mixture is stirred at 35–40° C. overnight. The reaction solution is washed with 0.5 N HCl (3×10 mL), water (10 mL) and dried over anhyd MgSO$_4$, followed by removal of the solvent in vacuo. The residue is purified by silica gel column chromatography (0→20% MeOH in CHCl$_3$) to give product.

Example 18
TFA salt of thiourea derivative of ara-C: Compound (26)
Compound 25 is subjected to the conditions as described for the preparation of 6 to give 26.

Example 19
20-O-[(2-aminoethoxy)-ethoxy]-acetic acid carbonate derivative of camptothecin TFA salt (30).
A suspension of camptothecin (27, 139 mg, 0.40 mmol), trophosgene (44 mg, 0.147 mmol) and DAMP (156 mg, 1.28 mmol) in anhydrous DCM (20 mL) is stirred for 10 minutes to form 28. Compound 2 (82 mg, 0.40 mmol) is added and the reaction mixture stirred for 16 hours, followed by removal of the solvent in vacuo. The residue is recrystallized from DCM-ether to give 29. Compound 29 is subjected to the condition as described for the preparation of 6 to give 30.

Example 20
Tetramer-loaded PEG-spacer-Drug derivatives.
32B: EDC.HCl (380.7 mg, 1.98 mmol) was added to a mixture of PEG-aspartic acid 40,000, prepared as described in the aforementioned USSN U.S. patent application Ser. No. 09/293,624, (31, 5.0 g, 0.124 mmol), 12 (432.5 mg, 1.24 mmol), NNM (400 mg, 3.97 mmol), and HOBT (201 mg, 1.49 mmol) in anhydrous DCM (80 mL) and DMF (50 mL) at 0 EC and the mixture was slowly warmed to room temperature overnight. The solvent was removed and the residue recrystallized from IPA to give 4.7 g (94%) of product. The amount of ara-C present in this compound as measured by UV assay was 2.33% and the conjugation (PEG conversion) yield 100%: $^{13}$C NMR (D$_2$O) δ39.82, 41.57, 52.74, 63.33, 72.09–73.36 (PEG), 77.48, 78.18, 87.12, 89.89, 99.35, 149.69, 158.68, 164.36, 173.95, 174.44, 174.81.

32A and 32C–G: Compound 6, 16, 20, 23, 26 and 30 are treated separately with the conditions as described the preparation of 32B to give 32A and 32C–G. 32H was prepared using the same procedure as that used for the synthesis of 32B except that 5-fluoro-ara-C was used in place of ara-C.

Example 21
PEG acid 4-amino-4-(2-tert-butoxycarbonyl-ethyl)-heptanedioic acid di-tert-butyl ester amide (35)
A mixture of PEG 40,000 diacid (34) (5.0 g, 0.125 mmol), 4-amino-4-(2-tert-butoxycarbonylethyl)-heptanedioic acid di-tert-butyl ester (33) (310 8 mg, 0.75 mmol), EDC.HCl (143.6 mg, 0.75 mmol), and DMAP (252 mg, 2.25 mmol) in anhydrous DCM is stirred at room temperature overnight. The reaction solution is concentrated in vacuo and the residue recrystallized from IPA to give the product (35).

Example 22
PEG acid 4-amino-4-(2-carboxyethyl)-heptanedioic acid amide (36)
Compound 35 (4.0 g, 0.1 mmol) is stirred in 25 mL of TFA and 50 mL of anhydrous DCM at room temperature for 5 hours. The solvent is removed in vacuo followed by recrystallization of the residue from chilled DCM/ether (20% v/v DCM in ether, total ca. 100 mL). The wet solid is redissolved in H$_2$O (20 mL) and the solution is stirred for 30 minutes at room temperature, followed by extraction with DCM (60 mL). The organic layer is dried over anhydrous MgSO$_4$ and the solvent is removed in vacuo followed by crystallization with DCM/ether to give the product (36).

Example 23
Hexamer-loaded PEG-spacer-Drug derivatives
37A: EDC.HCl (571.1 mg, 2.97 mmol) is added to a mixture of 36 (5.0 g, 0.124 mmol), 6 (934.5 mg, 1.86 mmol), NMM (600 mg, 5.96 mmol), and HOBT (302 mg, 2.24 mmol) in anhydrous DCM (80 mL) and DMF (50 mL) at 0° C. and the mixture is slowly warmed to room temperature overnight. The solvent is removed and the residue recrystallized from IPA to give 37A
37B–G: Compounds 12, 16, 20, 23, 26 and 30 are treated separately with the conditions as described the preparation of 37A to give 37B–G.

Example 24
Compound 40
EDC.HCl (2.47 g, 12.86 mmol) was added to a mixture of BocNH-aspartic acid (38, 1 g, 4.29 mmol), aspartic acid dimethyl ester HCl (39, 1.86 g, 9.43 mmol), and DMAP (2.47 g, 12.86 mmol) in anhydrous DCM (30 mL) and DMF (2 mL) at 0° C. and the mixture was stirred at 0° C. to room temperature overnight. The mixture was washed with 1 N HCl three times and the organic layer was dried over anhydrous MgSO$_4$, followed by removal of the solvent in vacuo to give the product (2.0 g, 90%).
$^1$H NMR δ1.45 (s, 9H), 2.62–3.02 (m, 6H, 3×CH), 3.70 (s, 6H, 2×OCH$_3$), 3.74 (s, 3H, OCH$_3$), 3.75 (s, 3H, OCH$_3$), 4.50 (bs, 1H, CH), 4.85 (m, 2H, 2×CH), 6.05 (d, J=6.95 Hz, 1H, NH), 6.98 (d, J=8.05 Hz, 1H, NH), 7.57 (d, J=7.69 Hz, 1H, NH).
$^{13}$C NMR δ28.178, 31.315, 35.846, 36.384, 37.223, 48.434, 48.619, 50.952, 51.908, 51.976, 52.697, 80.139, 162.462, 170.569, 170.804, 170.871, 170.972, 171.291.

Example 25
Compound 41
Compound 40 (2.0 g, 3.85 mmol) was dissolved in DCM (30 mL) and TFA (15 mL) and the solution was stirred for 2 hours at room temperature. The solvent was removed in vacuo and the residue was recrystallized twice with DCM-ether to give the product (1.74 g, 87%) as a white solid.
$^{13}$C NMR δ35.52, 48.76, 50.12, 51.90, 51.96, 52.65, 114.59, 118.49,168.43, 170.02, 170.92, 171.17, 171.40, 171.48.

Example 26
Compound 42
EDC.HCl (191.4 mg, 1.00 mmol) was added to a mixture of PEG-acid 40,000 (34, 5.0 g, 0.12 mmol), 41 (209 mg, 0.50 mmol), and DMAP (212.9 mg, 1.75 mmol) in anhydrous DCM (80 mL) at 0° C. and the mixture was stirred at 0° C. to room temperature overnight. The solvent was removed in vacuo and the residue was recrystallized from IPA to give product (4.5 g, 90%).
$^{13}$C NMR δ35.43, 36.71, 48.15, 48.25, 48.70, 51.50, 52.18, 52.24, 69.96–70.58 (PEG), 169.77, 169.82, 170.29, 170.40, 170.69.

Example 27
Compound 43
Compound 42 (4.5 g, 0.11 mmol) and LiOH H$_2$O (71.6 mg) was stirred in water (25 mL) overnight at room temperature. pH was adjusted to 2.5 by addition of 1 N HCl followed by extraction of the product into DCM three times. The organic layer was dried over anhydrous MgSO$_4$ and the solvent was removed in vacuo. The residue was recrystallized from IPA to give the product (3.6 g, 80%).

$^{13}$C NMR (D$_2$O) δ39.59, 40.65, 52.74, 54.31, 71.85–74.40 (PEG), 173.73, 173.92, 175.07, 178.99, 179.24, 179.35, 179.62.

Example 28
Octamer Loaded PEG Spacer-Drug Derivatives (44A–G)

44B. EDC.HCl (391 mg, 2.04 mmol) was added to a mixture of 43 (2.6 g, 0.06 mmol), 12 (444.1 mg, 1.27 mmol), HOBT (206.2 mg, 1.53 mmol), and NMM (411.3 mg, 4.07 mmol) in anhyd DCM (40 mL) and DMF (25 mL) at 0° C. and the mixture was stirred at 0° C. to room temperature overnight. The solvent was removed in vacuo and the residue was recrystallized from IPA to give product (2.6 g, 100%). The content of ara-C by UV analysis was 4% by weight and this corresponds with 90% coupling yield.

$^{13}$C NMR δ39.35, 39.66, 41.73, 52.53, 53.40, 55.00, 63.02, 63.49, 71.46–78.23 (PEG), 87.09, 89.98, 99.68, 149.79, 158.96, 164.56, 166.36, 174.15, 174.25, 174.39, 174.70, 175.04.

44A and 44C–G: Compound 6, 16, 20, 23, 26, and 30 is treated with the conditions as described the preparation of 44B to give 44A and 44C–G.

Example 29
Compound 45

Compound 40 (100 mg, 0.11 mmol) and LiOH H$_2$O (71.6 mg) is stirred in water (25 mL) overnight at room temperature. pH is adjusted to 2.5 by addition of 1 N HCl followed by extraction of the product into DCM three times. The organic layer is dried over anhydrous MgSO$_4$ and the solvent was removed in vacuo to give the product.

Example 30
Compound 48A–G

Compound 48A–G is prepared using the conditions in Examples 24–28 from 45 instead of 38.

Example 31
Compound 44G

EDC.HCl (2.47 g, 12.86 mmol) is added to a mixture of 45 (1.0 g, 2.15 mmol), 30 (5.5 g, 9.43 mmol), and DMAP (2.47 g, 12.86 mmol) in anhyd DCM (30 mL) and DMF (2 mL) at 0° C. and the mixture is stirred at 0° C. to room temperature overnight. The mixture is washed with 1 N HCl three times and the organic layer was dried over anhydrous MgSO$_4$, followed by removal of the solvent in vacuo and recrystallization of the residue from DCM-ether to give 49. Compound 49 is treated to the conditions in Examples 25 and 26 to give 44G.

Example 32
Compound 48G

Compound 46 (100 mg, 0.11 mmol) and LiOH H$_2$O (71.6 mg) is stirred in water (25 mL) overnight at room temperature. pH is adjusted to 2.5 by addition of 1 N HCl followed by extraction of the product into DCM three times. The organic layer is dried over anhydrous MgSO$_4$ and the solvent was removed in vacuo to give the product, which is treated to the conditions for the conversion of 45 to 44G as in Example 31 and gives 48G.

Example 33
Compound 53

PEG diol (51, 55 g, 1.38 mmol) was azeotrophed in toluene over a 2 hour period followed by removal of 200 mL of solvent by rotary evaporation. The solution was cooled to ~30° C. and triphosgene (0.544 g, 1.83 mmol) was added as solid followed by anhydrous pyridine (0.434 g, 5.49 mmol), and the reaction mixture stirred at 50° C. for 1 hour. N-hydroxyphthalimide (52, 1.12 g, 6.88 mmol) and anhydrous pyridine (0.54 g, 6.88 mmol) were added to the chloroformate mixture and the reaction stirred for a hours at 50° C. and 12 hours at room temperature. The reaction mixture was filtered through filter paper and the solvent removed in vacuo and the product crystallized from methylene chloride-ethyl ether (1100 mL, 8:2, v/v) to give the product (50.9 g, 92%).

$^{13}$C NMR δ123.62, 128.10, 134.55, 152.00, 160.00.

Example 34
Compound 54

DMAP (4.5 g, 36.86 mmol) was added to a solution of 53 (mw. 40,000, 74 g, 1.84 mmol) and 41 (9.83 g, 18.43 mmol) in 700 mL of anhydrous chloroform. Reaction was refluxed 24 hours under nitrogen. The reaction was cooled to room temperature and concentrated to ¼ volume. Crude product was precipitated with 2.5 L of ether, filtered and recrystallized from 5.5 L of IPA (65° C.). The product was filtered and washed twice with fresh IPA, twice with fresh ether, and dried overnight at 40° C. to yield 59.0 g (84%) of 54.

$^{13}$C NMR δ35.344, 36.931, 48.082, 48.208, 50.835, 51.509, 52.239, 61.045, 63.953, 68.854–72.056, 155.538, 170.102, 170.369, 170.453, 170.734.

Example 35
Compound 55

Compound 54 (51 g, 1.26 mmol) and LiOH.H$_2$O (0.8 g, 18.9 mmol) were dissolved in 300 mL of water and the solution stirred overnight at room temperature. The pH of the solution was adjusted to 2.5 by the addition of 1 N HCl. The solution was extracted with DCM (3×600 mL), the organic layers combined, dried over anhydrous MgSO$_4$ and concentrated in vacuo. The residue was recrystallized from DCM-ether to give the product which was collected by filtration and dried at 40° C. overnight to yield 38 g (54%) of the octa-acid.

$^{13}$C NMR (D$_2$O) δ38.384, 39.704, 51.951, 54.465, 62.934, 67.105, 71.445–74.381 (PEG), 159.772, 173.831, 174.940, 176.359, 176.696.

Example 36
Compound 56

EDC.HCl (1.13 g, 5.89 mmol) was added to a solution of 55 (10 g, 0.245 mmol), 12 (2.87 g, 5.89 mmol), and DMAP (1.43 g, 11.76 mmol) in anhydrous DCM (114 mL) and anhydrous DMF (29 mL) at 0° C. in an ice bath. Solution was stirred at 0° C. for 30 minutes then warmed to room temperature, followed by stirring under nitrogen for 36 hours. Solution was concentrated and the residue recrystallized from DCM-ether (100 mL–600 mL). Product was filtered and recrystallized twice from IPA. Product was collected by filtration and washed twice with fresh IPA then twice with fresh ether and dried in vacuum oven at 40° C. overnight to give 56 (6.07 g, 57%). The amount of ara-C in the product measured by UV assay was 4.17% by weight.

$^{13}$C NMR (D$_2$O) δ39.971, 41.755, 53.580, 54.423, 63.468, 67.232, 71.993–73.397 (PEG), 87.049, 89.970, 99.717, 149.744, 158.958, 159.941, 164.547, 174.252, 175.025.

Example 37
Compound 58

A mixture of Boc-Leu-OH (57, 1.5 g, 6.49 mmol), 9 (2.32 g, 19.48 mmol), EDC.HCl (2.49 g, 12.99 mmol), and DMAP (3.17 g, 25.97 mmol) in anhydrous DCM (30 mL) was stirred at room temperature overnight. The reaction mixture was diluted with 20 mL of DCM and washed with 1% NaHCO$_3$ (2×40 mL) and with 0.1 N HCl (2×40 mL). The organic layer was dried over anhydrous sodium sulfate and the solvent removed in vacuo to give 58 as a light yellow solid. The NMR showed it as a mixture of 58 with small amount of 9 as impurity and used as is.

Example 38
Compound 59

A mixture of 58 (1 g, 2.26 mmol) and 4 (1.2 g, 4.6 mmol) in anhydrous pyridine (30 mL) was stirred at 50° C. overnight. The reaction solution was filtered and the filtrate concentrated in vacuo and the residue was purified by column chromatography (20% MeOH in chloroform) to give 59 (824 mg, 80%).

$^{13}C$ NMR ($CD_3OD$) δ21.724, 23.433, 25.876, 28.638, 41.353, 55.594, 62.722, 76.459, 78.092, 80.870, 87.403, 89.525, 97.080, 148.244, 157.875, 164.210, 176.03.

Example 39
Compound 60

A solution of 59 (151 mg, 0.33 mmol) in 5 mL of DCM and 5 mL of TFA was stirred for 2 hours at room temperature, followed by concentration in vacuo. Recrystallization of the residue in DCM-ether gave 60 (155 mg, 100%).

Example 40
Compound 61

A mixture of 60 (6.49 mmol), 8 (19.48 mmol), EDC.HCl (2.49 g, 12.99 mmol), and DMAP (3.17 g, 25.97 mmol) in anhydrous DCM (30 mL) was stirred at room temperature overnight. The reaction mixture was diluted with 20 mL of DCM and washed with 1% $NaHCO_3$ (2×40 mL) and with 0.1 N HCl (2×40 mL). The organic layer was dried over anhydrous sodium sulfate and the solvent removed in vacuo to give 61.

Example 41
Compound 62

A solution of 61 (0.33 mmol) in 5 mL of DCM and 5 mL of TFA was stirred for 2 hours at room temperature, followed by concentration in vacuo. Recrystallization of the residue in DCM-ether gave 62 (0.33 mmol, 100%).

$^{13}C$ NMR ($CDCl_3$+$CD_3OD$) δ14.100, 20.654, 22.075, 24.199, 38.792, 39.918, 52.053, 60.936, 65.372, 66.171, 69.218, 69.461, 70.101, 74.555, 85.563, 87.855, 95.701, 146.569, 155.977, 162.031, 162.006, 170.735, 172.656, 172.694.

Example 42
Compound 63

Compound 62 was subjected to the same condition as in Example 28 for compound 44B by reacting with 43 to give 63 in 85% yield. The amount of ara-C present in 63 by UV was 4.36% wt/wt.

$^{13}C$ NMR ($D_2O$) δ23.258, 25.098, 27.120, 41.713, 42.106, 55.519, 63.440, 71.403–72.470 (PEG), 73.074, 77.667, 78.243, 87.105, 89.984, 99.759, 149.688, 159.000, 165.109, 175.137, 176.710.

Example 43
Compound 64

Compound 62 was subjected to the same condition as in Example 28 for compound 44B by reacting with 55 to give 64 in 88% yield. The amount of ara-C present in 63 by UV was 4.36% wt/wt.

$^{13}C$ NMR ($D_2O$) δ23.238, 25.126, 27.176, 39.957, 41.685, 42.176, 53.384, 54.521, 55.631, 63.047, 67.246, 71.530, 72.035, 72.302–72.400 (PEG), 72.695, 73.173, 74.437, 77.765, 78.285, 87.147, 90.040, 99.886, 149.730, 159.098, 159.941, 165.193, 174.210, 174.688, 174.912, 175.235, 176.822.

Example 44
In vivo

Athymic nude mice were implanted subcutaneous with a 4–5 $mm^3$ tissue fragment of LX-1 collected from donor mice. The tumor trocar site was observed twice weekly and measured once palpable. The tumor volume for each mouse was determined by measuring two dimensions with calipers and calculated using the formula: tumor volume=(length× $width^2$)/2. When tumors reached the average volume of 90 $mm^2$, the mice were divided into their experimental groups which consisted of untreated control, unmodified Ara-C and PEG-Ara-C. The mice were sorted to evenly distribute tumor size, grouped into 4 to 6 mice/group, and ear punched for permanent identification. Drugs were administered intravenously q3dx4 (Day 1, 4, 7 and 10) via the tail vein at an approximate rate of 0.5 mL per minute. Compounds were given both at an equal molar basis (absolute amount of active) of 20 mg/kg and at close their respective MTD (Ara-C, 100 mg/kg/dose (toxicity); PEG-AraC, 40 to 60 mg/kg/dose (volume). Mouse weight and tumor size were measured at the beginning of study and twice weekly through week 4. Drug effectiveness was determined by comparing tumor growth in treated versus untreated (no vehicle) control mice. Five types of endpoints were used as the basis for comparison: (a) mean tumor volumes at Day 28; (b) mean percent change in individual tumor volumes from initial; (c) percent difference in tumor volume (%T/C), measured when the control group's median tumor volume reached approximately 800–1100 $mm^3$ (exponential growth phase); (d) percent difference in tumor volume (%T/C) at Day 21 (~2000 $mm^3$) and (e) the number of tumor regression (smaller tumor volume at Day 21 (~2000 $mm^3$) and (e) the number of tumor regression (smaller tumor volume on Day 28 compared to Day 1) per group.

Results

Compound 32B demonstrated equivalent or better antitumor activity compared to native Ara-C at only 20 to 40% the active parent compound's dose (Table 1). In addition, only compound 32B produced a complete tumor regression (no detectable tumor), which was still undetectable at sacrifice on Day 68.

TABLE 1

Efficacy comparison between Ara-C and PEG-AraC[a] against subcutaneous human non-small cell lung carcinoma[b] (LX-1) in Nude mice

|  | Total Dose (mg/kg) | T/C(%)[x] at Day 14 | T/C (%)[x] at Day 21 | Regression at Day 28 (#/Grp) | Complete Regression (#/Grp) |
| --- | --- | --- | --- | --- | --- |
| Control | 0 | — | — | 0/6 | 0/6 |
| Ara-C | 80 | 51.1 | 52.2 | 0/4 | 0/4 |
| Ara-C | 400 | 16.7 | 33.4 | 1/6 | 0/6 |
| 32B | 80 | 28.6 | 31.9 | 1/6 | 1/6 |
| 32B | 160 | 20.6 | 22.1 | 0/6 | 0/6 |
| 44B | 160 | 24.4 | 51.6 | 0/6 | 0/6 |
| 44B | 240 | 21.8 | 42.1 | 0/6 | 0/6 |
| 56 | 240 | 39.4 | 54.7 | 0/6 | 0/6 |
| 63 | 240 | 40.6 | 55.8 | 0/6 | 0/6 |

[a]All PEG compounds were given 2x/week for 2 weeks, i.v.
[b]Mean baseline tumor volume was 90 $mm^3$.
[x]The median tumor volume of treatment and control groups were measured and compared when the control group's median tumor volume reached approximately 1000 $mm^3$ (day 14) and 2000 $mm^3$ (day 21).

Example 45
In Vitro Experiment

Cell Lines and Cytotoxicity Assays. Studies using P388/0 cell lines for $IC_{50}$ (drug concentration inhibiting growth of cells by 50%) were maintained and conducted as previously reported. Briefly, for $IC_{50}$ determination, cells were seeded into the microwell plates at a density of 2×1 cells per 50 μL per well. Plates were incubated at 37° C. in a humidified incubator with 5% $CO_2$ for 3 days. Cell growth was measured by the addition of 10 μL/well of Alamar Blue (Alamar Biosciences, Inc., Sacramento, Calif.) and the plates were incubated a further 4 hours at 37° C. The $IC_{50}$ values for each compound were determined from absorbance versus dilution factor plots. All cell cultures for animal implantation were maintained at 37° C. in a humidified atmosphere of 5% $CO_2$/95% $O_2$ and subcultured once a week. All cell lines were periodically tested for Mycoplasma and were Mycoplasma free. The results are shown in Table 2.

TABLE 2

In vitro results of Ara-C and Their PEG Derivatives.

| Compound # | $t_{1/2}(h)^a$ Rat Plasma | $t_{1/2}(h)^a$ Human Plasma | $IC_{50}(nM)^a$ P388/0 |
|---|---|---|---|
| Ara-C (4) | — | — | 10 |
| 32B | 3.2 | 4.4 | 50 |
| 44B | 4 | 4.1 | 39 |
| 56 | 4 | 5.7 | 19 |
| 63 | 11.3 | 7.6 | 40 |
| 64 | 9.6 | 15.4 | TBD[b] |

[a] All experiments were done at 37° C. in duplicate and $t_{1/2}$ was measured by the disappearance of PEG derivatives. Standard deviation of measurements = ±10%
[b] To be determined The various publications, patents, patent applications and published applications mentioned in this application are hereby incorporated by reference herein.

While there have been described what are presently believed to be the preferred embodiments of the invention, those skilled in the art will realize that changes and modifications may be made without departing from the spirit of the invention. It is intended to claim all such changes and modifications as fall within the true scope of the invention.

We claim:

1. A compound comprising the formula:

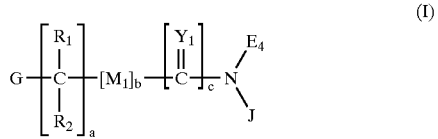

(I)

wherein:

J is

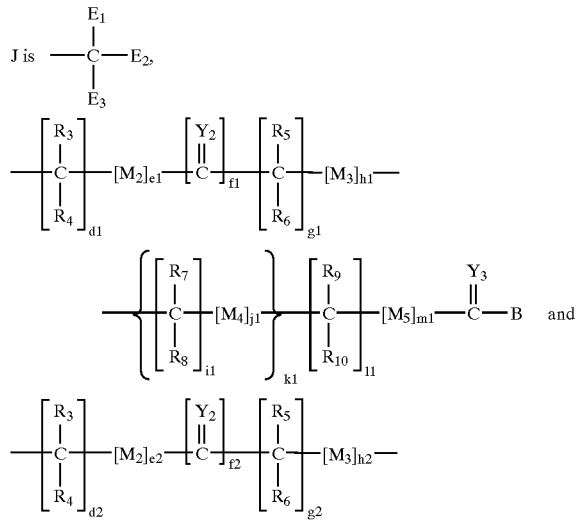

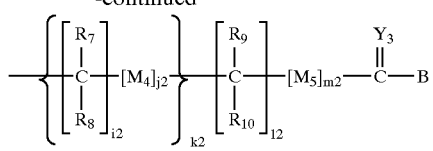

$E_{1-4}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

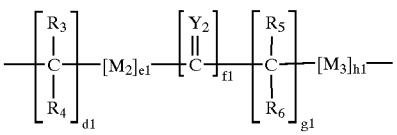

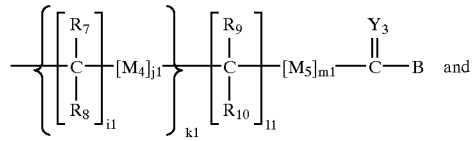
and

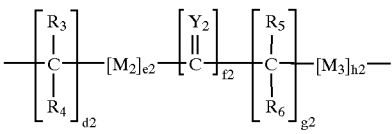

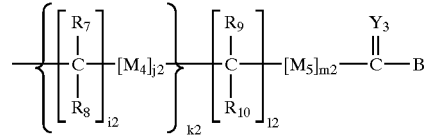

and at least one of $E_{1-4}$ includes a B moiety;

B is a leaving group, OH, a residue of a hydroxyl-containing moiety, a residue of an amine-containing moiety or

wherein $E_5$ is independently selected from the same group which defines $E_{1-4}$;

$J_1$ is 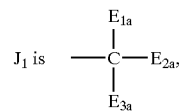

$E_{10-30}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

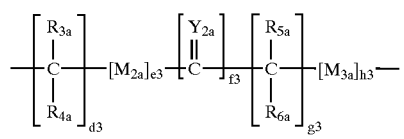

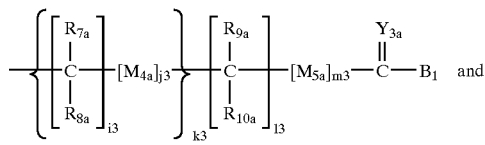

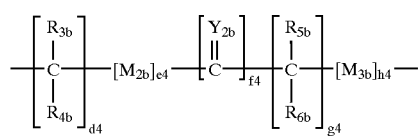

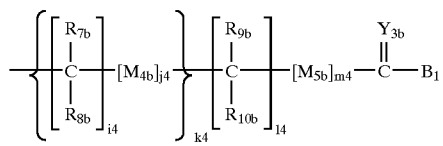

wherein $B_1$ is a leaving group, OH, a residue of a hydroxyl-containing moiety or a residue of an amine-containing moiety or

wherein $E_6$ is independently selected from the same group which defines $E_{1-4}$;

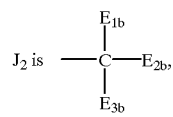

wherein $E_{1b-3b}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

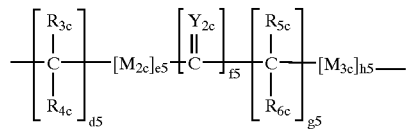

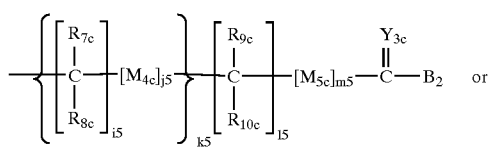

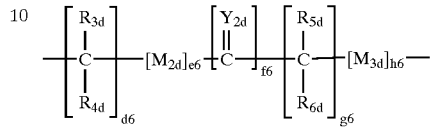

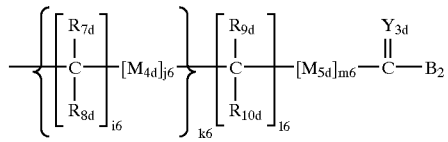

wherein $B_2$ is a leaving group, OH, a residue of a hydroxyl-containing moiety or a residue of an amine-containing moiety;

G is a polymeric residue;

$Y_{1-3}$, $Y_{2a-d}$ and $Y_{3a-d}$ are each independently O, S or $NR_{11a}$ $M_{1-4}$, $M_{2a-2d}$, $M_{3a-3d}$, and $M_{4a-4d}$ are each independently O, S or $NR_{11b}$;

$M_5$ and $M_{5a-d}$ are each independently X or Q, wherein X is an electron withdrawing group and Q is a moiety containing a free electron pair positioned three to six atoms from $C(=Y_3)$ or $C(=Y_{3a-d})$;

$R_{1-10}$, $R_{1a-11a}$, $R_{1b-11b}$, $R_{1c-10c}$ and $R_{1d-10d}$ are each independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy;

a, b, c, d1-d6, e1-e6, f1-f6, g1-g6, h1-h6, i1-i6, m1-m6 are each independently zero or a positive integer; and i1-i6, j1-j6 and k1-k6 are each independently selected positive integers.

2. The compound of claim 1, wherein G further comprises a capping group A, which is selected from the group consisting of hydrogen, $CO_2H$, $C_{1-6}$ alkyl moieties, and (I')

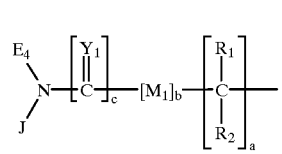

wherein a, b, c, $R_{1-2}$, $M_1$, $Y_1$, $E_4$ and J are the same as set forth in claim 1.

3. A compound of claim 2, of the formula:

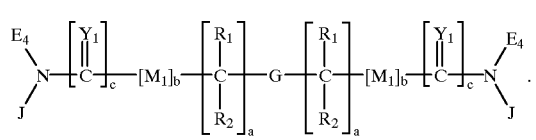

4. The compound of claim 1, where a, b, c, d1-d6, e1-e6, f1-f6, g1-g6, h1-h6, l1-l6, and m1-m6 are independently zero, one or two; and i1-i6, j1-j6, and k1-k6 are independently one or two.

5. The compound of claim 1, wherein $R_1$ and $R_2$ are both H, a and c are one, $Y_1$ is O and both and $E_1$ and $E_4$ are H.

6. The compound of claim 1, wherein G is polyalkylene oxide residue.

7. The compound of claim 6, wherein G is a polyethylene glycol residue.

8. The compound of claim 1, wherein G is —O—$(CH_2CH_2O)_x$ or —O—$(CH(CH_3)CH_2O)_x$.
wherein x is the degree of polymerization.

9. The compound of claim 8, wherein G is —O—$(C_2CH_2O)_x$ and x is a positive integer so that the weight average molecular weight is at least about 20,000 daltons.

10. The compound of claim 9, wherein G has a weight average molecular weight of from about 20,000 to about 100,000 daltons.

11. The compound of claim 10, wherein G has a weight average molecular weight of from about 25,000 to about 60,000 daltons.

12. The compound of claim 1, wherein B is a residue of an amine-containing moiety.

13. The compound of claim 12, wherein said amine-containing moiety is

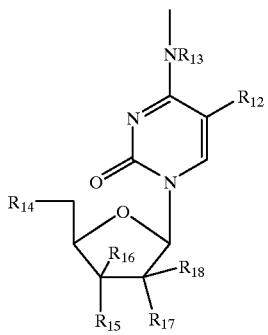

wherein $R_{12-13}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, halo, substituted aryls, aralkyls, $C_{1-6}$ heteroalkyls, substituted $C_{1-6}$ heteroalkyls;

$R_{14-18}$ are independently selected from alkoxy, e.g. $OR_{19}$ or, in the alternative, H, OH, $N_3$, $NHR_{20}$, $NO_2$ or CN, fluoro, chloro, bromo, iodo, where $R_{19-20}$ are independently selected from the same group which defines $R_{12-13}$.

14. A compound of claim 3, selected from the group consisting of:

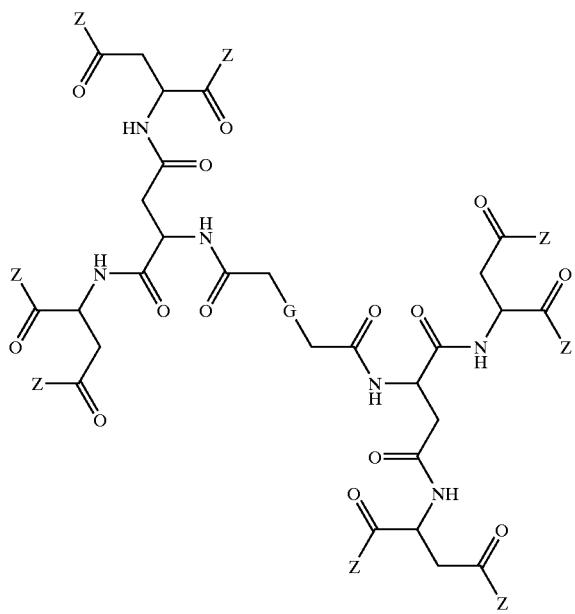

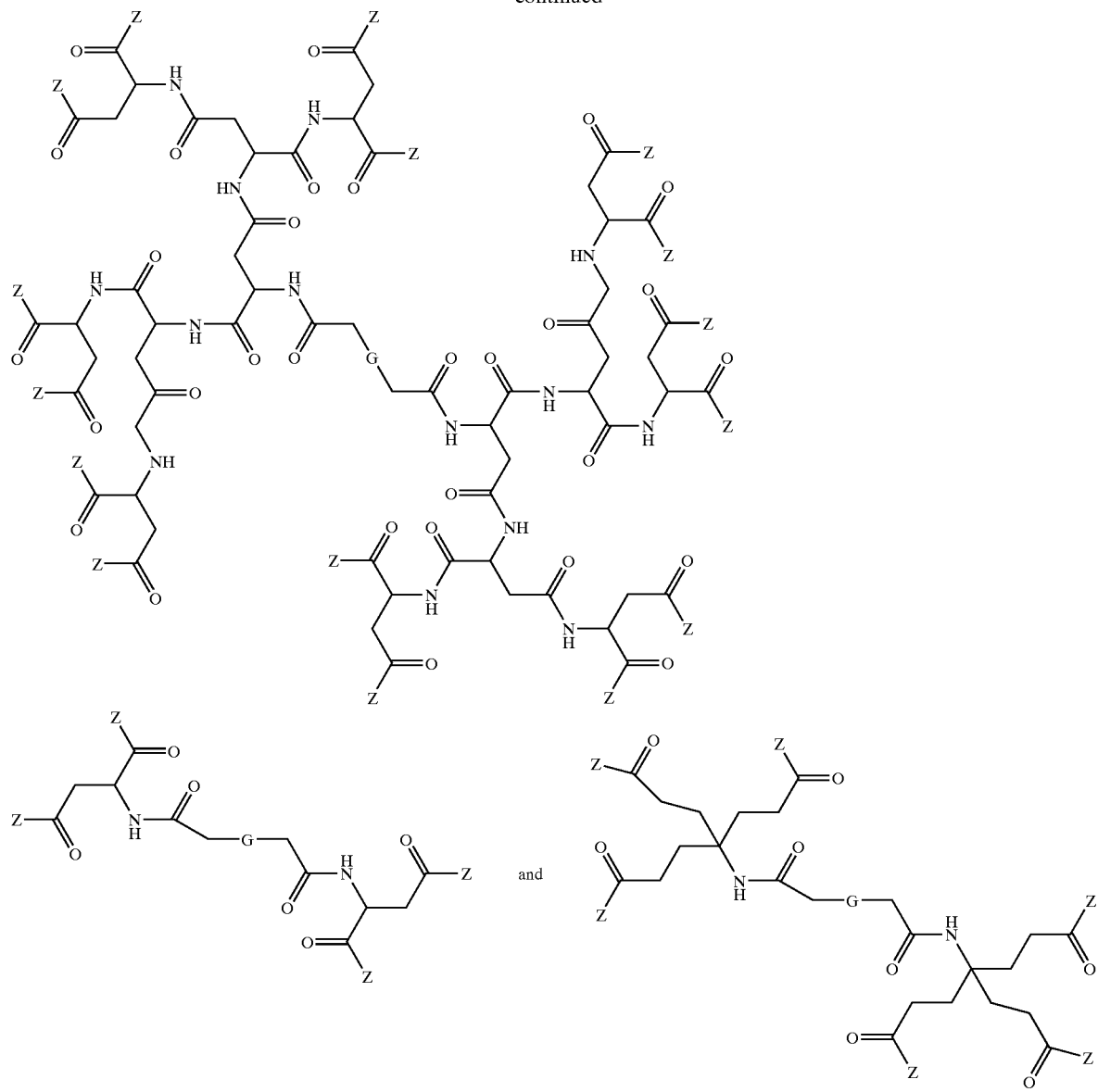
wherein Z is one of:
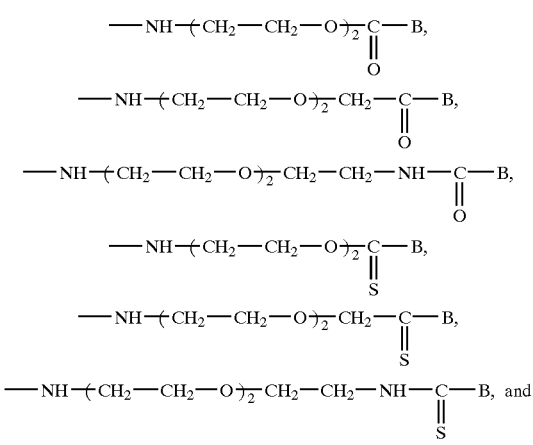
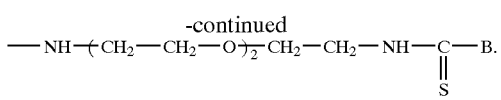
15. A method of preparing a polymeric transport system, comprising
a) reacting compound of the formula:
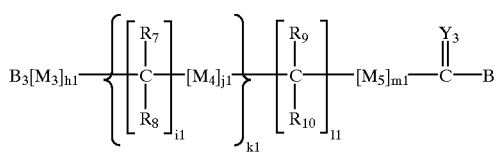
wherein
B is a residue of a biologically active amine-containing moiety or a hydroxyl-containing moiety;

$B_3$ is a cleavable protecting group;
$Y_3$ is O, S, or $NR_{11m}$;
$M_3$ and $M_4$ are independently O, S, or $NR_{11h}$;
$M_5$ is X or Q;
wherein X is an electron withdrawing group and Q is a moiety containing a free electron pair positioned three to six atoms from $C(=Y_3)$;
$R_{7-10}$ and $R_{11a-b}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;
h1, i1, j1, l1 and m1 are each independently zero or a positive integer;
k1 is a positive integer;
b) cleaving the cleavable protecting group $B_3$; and
c) reacting the resultant compound with a compound of the formula

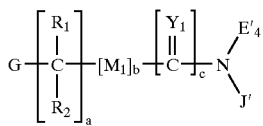

wherein

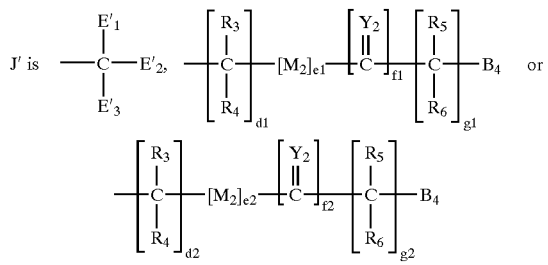

$H'_{1-4}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy, $C_{1-6}$ heteroalkoxy,

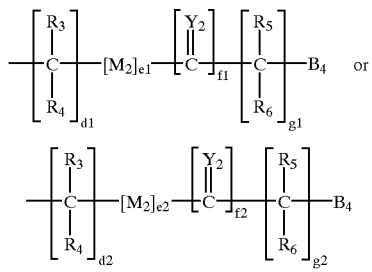

wherein
$B_4$ is a leaving group;
G is a polymer residue;

$Y_{1-2}$ are independently O, S, or $NR_{11a}$;
$M_{1-2}$ are independently O, S, or $NR_{11b}$;
$R_{1-6}$, $R_9$ and $R_{10}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;
a, b, c, $d_1$-$g_1$ and $d_2$-$g_2$ are each independently zero or a positive integer,
whereby a polymeric conjugate is formed.

16. A method of preparing a polymeric transport system, comprising:
reacting a biologically active moiety containing an unprotected amino or hydroxyl group with polymeric residue containing a terminal moiety of the formula:

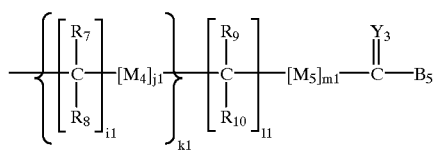

wherein:
$Y_3$ is O, S, or $NR_{11a}$;

wherein:
$Y_3$ is O, S, or $NR_{11a}$;
$R_{7-10}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls and substituted $C_{1-6}$ heteroalkyls;
$M_{4-5}$ are independently O, S, or $NR_{11b}$;
$R_{11a}$ and $R_{11b}$ are independently selected from the group consisting of hydrogen, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy;
$B_5$ is a leaving group capable of reacting with an unprotected amino or hydroxyl group of a biologically active moiety;
i1, j1, l1 and m1 are each independently zero or a positive integer,
k1 is a positive integer; and
whereby a polymeric conjugate is formed.

17. A method of treatment, comprising:
administering to a mammal in need of such treatment an effective amount of a compound of claim 1, wherein B is a residue of a biologically active moiety.

18. A method of treatment, comprising:
administering to a mammal in need of such treatment an effective amount of a compound of claim 3, wherein B is a residue of a biologically active moiety.

* * * * *

UNITED STATES PATENT AND TRADEMARK OFFICE
CERTIFICATE OF CORRECTION

PATENT NO.         : 6,777,387 B2  
APPLICATION NO. : 09/823296  
DATED              : August 17, 2004  
INVENTOR(S)        : Richard B. Greenwald et al.

It is certified that error appears in the above-identified patent and that said Letters Patent is hereby corrected as shown below:

Column 15, line 22, "i11-m1" should read -- i1-m1 --

Column 30, line 49, "i1-i6" should read -- I1-I6 --

Signed and Sealed this

Fifteenth Day of May, 2007

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,777,387 B2 | Page 1 of 1 |
| APPLICATION NO. | : 09/823296 | |
| DATED | : August 17, 2004 | |
| INVENTOR(S) | : Richard B. Greenwald et al. | |

It is certified that error appears in the above-identified patent and that said Letters Patent is hereby corrected as shown below:

Column 15, line 22, "i11-m1" should read -- i1-m1 --

Column 30, line 49, "i1-i6" should read -- l1-l6 --

This certificate supersedes Certificate of Correction issued May 15, 2007.

Signed and Sealed this

Fourteenth Day of August, 2007

JON W. DUDAS
*Director of the United States Patent and Trademark Office*